United States Patent

Sasa et al.

[11] Patent Number: 6,068,906
[45] Date of Patent: May 30, 2000

[54] MOLD FOR MAKING DISC SUBSTRATE, PROCESS FOR PRODUCING MOLD AND DISC SUBSTRATE

[75] Inventors: Takeshi Sasa; Toshihiko Takegawa; Eiki Oyanagi; Takehisa Ishida, all of Miyagi, Japan

[73] Assignee: Sony Corporation, Tokyo, Japan

[21] Appl. No.: 08/983,243

[22] PCT Filed: May 9, 1997

[86] PCT No.: PCT/JP97/01575

§ 371 Date: Apr. 30, 1998

§ 102(e) Date: Apr. 30, 1998

[87] PCT Pub. No.: WO97/43100

PCT Pub. Date: Nov. 20, 1997

[30] Foreign Application Priority Data

May 10, 1996 [JP] Japan ................................. 8-116316
May 10, 1996 [JP] Japan ................................. 8-116317
May 10, 1996 [JP] Japan ................................. 8-116318

[51] Int. Cl.[7] ................................................. G11B 5/66
[52] U.S. Cl. ..................... 428/64.2; 428/64.4; 428/65.3; 428/141; 428/694 ST; 428/694 SL; 428/694 SG; 428/900; 264/1.33; 264/2.7; 264/106; 264/107; 264/2.2; 264/2.5; 264/1.36; 264/1.38
[58] Field of Search .................... 428/64.2, 64.4, 428/65.3, 141, 694 ST, 694 SL, 694 SG, 900; 264/106, 107, 1.33, 2.5, 2.7, 1.36, 1.38, 2.2

[56] References Cited

U.S. PATENT DOCUMENTS 4,892,692  1/1990  Takada ................................. 264/106

FOREIGN PATENT DOCUMENTS

| 62-248133 | 10/1987 | Japan . |
| 63-188013 | 3/1988 | Japan . |
| 63-188013 | 8/1988 | Japan . |
| 1-192014 | 2/1989 | Japan . |
| 1-135606 | 5/1989 | Japan . |
| 1-192014 | 8/1989 | Japan . |
| 2-70408 | 3/1990 | Japan . |
| 2-134220 | 5/1990 | Japan . |
| 3-146318 | 6/1991 | Japan . |
| 6-36361 | 2/1994 | Japan . |
| 8-66945 | 3/1996 | Japan . |

Primary Examiner—Leszek Kiliman
Attorney, Agent, or Firm—Hill & Simpson

[57] ABSTRACT

A disc substrate molding metal mold apparatus adapted for molding synthetic resin material to carry out molding of disc substrate of an information signal recording medium. This metal mold apparatus is adapted so that smoothing layers of metal are integrally formed on the molding plane surface sides of a first metal mold serving as the fixed side and a second metal mold serving as the movable side which are butted to each other to constitute a molding portion for molding disc substrate, and uneven patterns corresponding to information signals, etc. formed at the disc substrate are directly formed at the metallic layers, thus to carry out molding of disc substrate in which the surface is flattened with high accuracy, and uneven patterns of the metal mold side are transferred without allowing local undulations and/or projections occurring on the disc surface to take place.

30 Claims, 16 Drawing Sheets

SURFACE STATE OF
FORMED METAL MOLD

EDGE SHAPE OF UNEVEN PATTERN IN CASE WHERE
TEMPERATURES OF RESPECTIVE MOLD BODIES
HAVE BEEN CONTROLLED SO AS TO TAKE (gT-24)°C

EDGE SHAPE OF UNEVEN PATTERN IN CASE WHERE
TEMPERATURES OF RESPECTIVE MOLD BODIES
HAVE BEEN CONTROLLED SO AS TO TAKE (gT-10)°C

EDGE SHAPE OF UNEVEN PATTERN IN CASE WHERE TEMPERATURES OF RESPECTIVE MOLD BODIES HAVE BEEN CONTROLLED SO AS TO TAKE (gT-28)°C

SURFACE STATE OF DISC BASE

STATE OF RECORDING TRACK

MOLD FOR MAKING DISC SUBSTRATE, PROCESS FOR PRODUCING MOLD AND DISC SUBSTRATE

TECHNICAL FIELD

This invention relates to a metal mold apparatus used for molding disc substrate constituting disc-shaped recording medium such as magnetic disc, etc. and a method of manufacturing such a metal mold apparatus, and relates to a disc substrate manufactured by metal mold apparatus as described above.

BACKGROUND ART

Hitherto, as a data memory unit for computer, there is used a disc drive unit using magnetic disc as a recording medium.

As a magnetic disc used as a recording medium of the disc drive unit, there is used a magnetic disc in which magnetic film serving as a recording layer for information signals is formed on the surface of a disc substrate obtained by molding synthetic resin.

In disc drive units using magnetic disc of this kind as recording medium, the magnetic head is caused to scan, along inner and outer circumferential directions, the signal recording area of the magnetic disc rotated so that recording/reproduction of information signals is carried out. The magnetic discs used in this disc drive units are adapted so that high density has been realized along with increase in the recording capacity. In order to efficiently carry out recording and/or reproduction of information signals with respect to the magnetic discs in which high density has been realized and recording capacity has been increased as described above, it is necessary to improve transfer rate of information signals. In order to improve the transfer rate of information signals, it is necessary to increase the rotational speed of the magnetic disc, and to shorten the time required when the magnetic head seeks recording tracks of the magnetic disc.

In order to improve the seek speed of the magnetic head, there is used a disc drive unit such that dynamic pressure produced as the result of the fact that the magnetic disc rotates is utilized to produce air flow between the magnetic disc and the magnetic head to thereby carry out recording and/or reproduction of information signals in the state where the magnetic head is caused to float from the magnetic disc.

By using such flowing type magnetic head in this way, improvement in the transmission rate of information signals can be realized and the recording density of the magnetic disc can be improved. In addition, long life time of the magnetic disc and the magnetic head can be realized.

Meanwhile, in the magnetic head floating from the magnetic disc, in order to carry out stable recording and/or reproduction of information signals, the magnetic head is required to maintain stable attitude during recording and/or reproduction thus to scan on the magnetic disc with a fixed spacing being held from the magnetic disc. Namely, it is necessary to prevent that the spacing between the magnetic head and the magnetic disc is changed so that magnetic field strength across the magnetic head and the magnetic disc is fluctuated.

In view of the above, in the disc drive unit using the floating type magnetic head, the magnetic head is caused to float with a spacing of 1 $\mu$m or less from the surface of the magnetic disc.

In the magnetic disc used in the disc drive unit adapted for allowing the magnetic head to float to carry out recording and/or reproduction of information signals as stated above, it is necessary to smooth, with high accuracy, the surface that the magnetic head scans. Since the magnetic head is permitted to float only by about 1 $\mu$m or less from the surface of the magnetic disc, when very small uneven portion is waviness takes place at the surface of the magnetic disc, the magnetic head may collide with the rotating magnetic disc. As a result, there is also possibility that the magnetic head and/or the magnetic disc may be damaged.

In magnetic discs and/or optical discs using disc substrate obtained by molding synthetic resin, which are used as a recording medium of the disc drive unit, there have been proposed discs on which there are formed track pattern indicating recording tracks where information signals are recorded, and information signals and/or control signals are further recorded.

A disc substrate 101 constituting such magnetic disc is molded by using a metal mold unit 102 as shown in FIG. 1. This metal mold unit 102 comprises a first metal mold 104 serving as the fixed side and a second metal mold 105 serving as the movable side, which are adapted so that they are butted to each other to constitute a cavity 103 constituting the molding unit for molding the disc substrate 101. At the disc molding plane surface side constituting the cavity 103 of the first and second metal molds 104, 105, there are attached stampers 106, 107 for forming track pattern and/or uneven pattern corresponding to information signals and/or control signals on the both surfaces of the disc substrate 101 molded by this metal mold unit 102.

At the outer circumferential side of the second metal mold 105, there is assembled a ring-shaped outer circumferential side metal mold 108 which forms the outer circumferential surface of the disc substrate 101. Further, the first metal mold 104 is adapted so that there are disposed a sprue bush 109 in which a nozzle 109a for filling synthetic resin material in molten state constituting the disc substrate 101 into the cavity 103 is formed at the central portion thereof, and a stamper holder 110 fitted at the outer circumferential side of the sprue bush 109.

In addition, the second metal mold 105 is adapted so that there are disposed, at the central portion thereof, a punch 111 for forming a center hole at the disc substrate 101 molded within the cavity 103, and a ring-shaped eject member 112 within which the punch 111 is accommodated so that it can be advanced and withdrawn.

In this example, the metal mold unit 102 is adapted so that temperature adjustment circuits, etc. are respectively provided at the first and second metal molds 104 and 105 for the purpose of stably molding the disc substrate 101 under the constant temperature condition.

In order to mold the disc substrate 101 by the metal mold unit 102 provided with the configuration as described above, synthetic resin material in molten state is filled into the cavity 103 through the nozzle 109a of the sprue bush 109 in the mold clamped state where the first and second metal molds 104, 105 are butted to each other. The punch 111 is extruded into the cavity 103 in the state where the synthetic resin filled within the cavity 103 is semi-hardened to form a center hole of the disc substrate 101 to be molded. Thereafter, in the metal mold unit 102, the second metal mold 105 constituting the movable side is caused to undergo such an operation that it is spaced relative to the first metal mold 104 so that mold opening operation is carried out. Thus, molding operation of the disc substrate 101 is completed.

In this case, when mold opening operation is carried out, the disc substrate 101 affixed or attached to the second metal mold 105 side is pushed by an eject member 112. Thus, taking-out operation from the metal mold unit 102 of the molded disc substrate 101 is carried out.

At the surfaces which are respective principal surfaces of the disc substrate 101, uneven patterns formed on these stampers 106, 107 disposed within the metal mold unit 102 are transferred and formed by the stampers 106, 107 when the disc substrate 101 is molded.

Meanwhile, the stampers 106, 107 for forming uneven patterns on the disc substrate 101 are adapted so that the back side thrust to the smoothed molding plane surface sides of the first and second metal molds 104, 105 are polished in order to allow the disc substrate 101 to be molded so as to have a fixed thickness with high accuracy.

However, since the uneven patterns are formed on the surfaces of the stampers 106, 107, in the case where the back faces are caused to undergo abrasion processing, it is difficult to smooth them with high accuracy. As shown in FIG. 2, waviness would be produced. In FIG. 2, the ordinate indicates amplitude of the waviness and the abscissa indicates distance in the tangential direction of recording tracks formed in a concentrical form at the disc substrate 101.

As seen from FIG. 2, with respect to waviness taking place at the stampers 106, 107, when width of the head slider to which the magnetic head used in the disc drive unit is attached is assumed to be 2 mm, waviness of about 0.2 $\mu$m takes place per width of the head slider.

Moreover, when the head slider is operated by 5000 $\mu$m (5 mm) in the tangential direction of concentrical recording tracks at an arbitrary position in the radial direction of the disc substrate 101, relative large uneven waviness of about 200 nm as compared to the head slider having width caused to be 2 mm takes place in the thickness direction of the disc substrate 101 within the range of 5000 $\mu$m as shown in FIG. 2.

When the disc substrate 101 is molded, pressure is applied to the stampers 106, 107 attached to the metal mold unit 102 by synthetic resin material filled into the cavity 103. By this pressure, waviness which have taken place at the back face sides appear at the surface sides where the uneven patterns are formed of the stampers 106, 107. As a result, the stampers 106, 107 would transfer undulations of the back faces to the disc substrate 101 to be molded or formed along with the uneven patterns.

The state where waviness taking place at the back faces of the stampers 106, 107 are transferred to the disc substrate 101 will now be described with reference to FIGS. 3 and 4.

In the state where no pressure is applied to the stampers 106, 107, waviness 113 which have taken place at positions designated at A, B and C of the back faces 106*b* of the respective stampers 106, 107 do not appear on the surfaces 106*a* of the respective stampers 106, 107 as shown in FIG. 3.

When the first and second metal molds 104, 105 are butted to each other so that mold clamping is carried out and synthetic resin material constituting the disc substrate 101 is filled into the cavity 103 as shown in FIG. 4, pressure of the synthetic resin material to be filled is applied to the stampers 106, 107. Thus, the stampers 106, 107 are deformed by this pressure and undulations 113 taking place at positions designated at A, B and C of the back face 106*b* appear on the surface 106*a* side facing to the cavity 103 side. As a result, such undulations would be transferred onto the disc substrate 101 to be molded or formed.

The state of the surface of the disc substrate 101 where undulations 113 of these stampers 106, 107 have been transferred will now be described with reference to FIG. 5.

In FIG. 5, the ordinate indicates amplitude of waviness 113 and the abscissae indicates distance in the tangential direction with respect to recording tracks formed in a concentrical form at the disc substrate 101.

As seen from FIG. 5, at the disc substrate 101, when the magnetic head scans the position spaced by distance of 4000 $\mu$m in the tangential direction of recording tracks from an arbitrary position in the radial direction, projections of about 50 nm take place with respect to warp of the entirety of the disc substrate 101 within the range from 2000 $\mu$m to 3000 $\mu$m. Such projections are waviness in the projection form of the disc substrate 101 taking place resulting from the degree of surface roughness which indicate roughness of the back faces 106*b* of the stampers 106, 107. In addition, in FIG. 5, recessed portions in acute angle form of about 60 nm formed in the thickness direction of the disc substrate 101 are recessed patterns which constitute servo pattern and or track pattern, etc.

In this case, in the case where the magnetic head scans the signal recording surface of the magnetic disc constituted by using the above-described disc substrate 101 in the state where the head slider having width of the portion where the magnetic head is attached, which is caused to be 2 mm, is caused to float at height of interval of about 50 nm with respect to the disc average plane of the signal recording surface, if there exists projection 113*a* of about 50 nm with respect to warp of the entirety of the disc substrate 101 as shown in FIG. 5, the head slider 115 collides against the projection 113*a*, thus damaging the magnetic head or the magnetic disc.

The stampers 106, 107 fitted with respect to the above-described metal mold unit 102 come into contact with synthetic resin material of high temperature of 300° C. or more at the time of molding of the disc substrate 101, and are caused to undergo thermal expansion in the radial direction. For this reason, uneven patterns formed so as to take concentrical complete round shape, which are provided for forming recording tracks of the disc substrate 101 formed at the stampers 106, 107, are distorted.

The state of the distortion of these stampers 106, 107 will now be described with reference to FIG. 6. In FIG. 6, broken lines indicate normal complete round recording track $T_1$ of the stampers 106, 107, and solid line indicates, in a model form, track $T_2$ in the case where the stampers 106, 107 are distorted and strained with respect to the center O.

Further, the stampers 106, 107 are formed by using nickel as material, wherein its weight is about 50 g which is approximately 1/500 of the first and second metal molds 104, 105 constituting the metal mold unit 102, and the thickness of the unit is about 1 mm. In addition, the respective stampers 106, 107 are attached to the first and second metal molds 104, 105 with their inner circumferential sides being supported. These stampers 106, 107 come into contact with high temperature molten synthetic resin material of 300° C. or more filled within the cavity 103, so their temperatures suddenly rise. Thus, they are expanded in the radial direction. After molding of the disc substrate 101, these stampers are gradually cooled by the first and second metal molds 104, 105, so they are contracted. At this time, as shown in FIG. 6, the stampers 106, 107 are affected by the state of contact with the first and second metal molds 104, 105. As a result, the thermal expansion and the thermal contraction become uneven. Thus, the recording track $T_1$ of complete round is deformed in the directions indicated by arrows in FIG. 6, so distortion takes place. Since the recording track $T_2$ strained or deformed by uneven thermal expansion and thermal contraction is transferred onto the disc substrate 101 molded or formed by such stampers 106, 107, recording track formed on the disc substrate 101 would be strained or deformed.

Since the magnetic disc formed by using disc substrate 101 on which such strained or deformed recording tracks are formed is adapted so that since the servo pattern and/or the track pattern become eccentric, when such magnetic disc is loaded into the disc drive unit to carry out recording/reproduction of information signals, it becomes difficult that the magnetic head precisely scans recording tracks. Thus, recording/reproduction of information signals would fail to be carried out with satisfactory characteristic.

Moreover, coefficient of thermal expansion of synthetic resin material constituting the disc substrate 101 is 50~90× $e^{-6}$ (1/deg). On the other hand, since main components of the stampers 106, 107 used for molding of the disc substrate 101 are nickel, the coefficient of thermal expansion is about 10×$e^{-6}$ (1/deg). Since coefficients of thermal expansion of the disc substrate 101 and the stampers 106, 107 are different from each other, difference takes place between respective quantities of contraction in the cooling process where the disc substrate 101 and the stampers 106, 107 are cooled after the disc substrate 101 is molded. For this reason, in the disc substrate 101 which is molded body of solidified synthetic resin, stresses $F_1$, $F_2$ are respectively produced between the disc substrate 101 and the stampers 106, 107 by difference of coefficient of thermal expansion therebetween as shown in FIG. 7. As a result, the phenomenon that edge portion 122 of uneven pattern 121 formed on the disc substrate 101 is broken takes place.

Moreover, since the first and second metal molds 104, 105, the stampers 106, 107 and the disc substrate 101 respectively have different coefficients of thermal expansion, and quantity of thermal conduction and/or contraction quantity become uneven by the state of contact between the first and second metal molds 104, 105 and the stampers 106, 107, breakage of the edge portion 122 of the uneven pattern 121 is further complicated.

The state where, with respect to the disc substrate 101 molded by the above-described metal mold unit 102, the edge portion 121 of the uneven pattern 122 formed on the disc substrate 101 is broken by difference between thermal contraction factors of the disc substrate 101 and the first and second metal molds 104, 105 which are cooled and solidified) will now be described with reference to FIG. 8.

Synthetic resin material which forms the disc substrate 101, which is filled into the cavity 103 of the metal mold unit 102, has coefficient of thermal expansion of 12×$e^{-6}$ (1/deg). The first and second metal molds 104, 105 have coefficient of thermal expansion of 12×$e^{-6}$ (1/deg) in the case where they are formed by material of stainless system. Accordingly, the thermal contraction difference between the disc substrate 101 and the stampers 106, 107 which are cooled and solidified when the disc substrate 101 cooled and solidified at glass transition temperature (Tg)° C. is cooled so that its temperature reaches temperatures of the first and second metal molds 104, 105 is determined by (90–12)×$e^{-6}$, i.e., (Tg–temperature of metal mold)° C.

Further, with respect to the disc substrate 101 to be molded or formed, since the edge portion 122 of the uneven pattern 121 to be formed has mechanical strength smaller than that of uneven pattern 123 formed at the stampers 106, 107 as shown in FIG. 8, the edge portion 122 positioned at the central portion side of the disc substrate 101 is broken by the stampers 106, 107, so very small projection 122a takes place. In the case where such projections 122a is formed, when magnetic disc constituted by using this disc substrate 101 is loaded into the disc drive unit to carry out recording/reproduction of information signals, there is the possibility that the magnetic head may collide against the projection 122a of the disc substrate 101 so that the magnetic head is broken.

Further, the stampers 106, 107 fitted with respect to the above-described metal mold unit 102 is manufactured by experiencing mastering process for making up glass master block from glass base and electrocasting process for implementing electrocasting processing onto this glass master block. On the surface of the glass base of which surface is well polished, photoresist layer having uniform film thickness is formed by, e.g., spin coat process, etc. Namely, in the state where the glass base is mounted on the rotary table and is rotationally driven, photosensitive resist in liquid state is dropped on the central portion of the surface of the glass base. The photosensitive resist thus dropped is diffused at the surface of the glass base by centrifugal force to form photosensitive resist layer of uniform film thickness. Further, exposure corresponding to uneven pattern which constitutes various data recorded on the magnetic disc is carried out with respect to the photosensitive resist layer of the glass base. Thus, latent image of the uneven pattern is formed. This exposure is carried out by irradiation of laser. The latent image formed at the photosensitive resist layer of the glass base is actualized by development processing of the photosensitive resist layer. Thus, glass master block adapted so that the uneven pattern is formed on the surface thereof is manufactured.

Conductive film formation processing for forming metallic thin film by sputtering process or vacuum deposition process, etc. is implemented onto the surface of the glass master block. Further, from this glass master block, electrocasting processing is implemented thereto with the glass master block being as the electrode, whereby, e.g., nickel is deposited on its surface until a predetermined thickness is provided. Thus, making up of nickel master is carried out. The stampers 106, 107 are made up through mother made up by further implementing the electrocasting processing to this nickel master.

At the principal surfaces of stampers 106, 107 manufactured through process steps as described above, extremely precise and very small uneven portions are integrally formed in a concentrical form and/or radially in correspondence with uneven patterns corresponding to respective data recorded on the magnetic disc.

Meanwhile, at the metal mold unit 102 to which the stampers 106, 107 manufactured through process steps as described above are affixed, there is provided a temperature adjustment circuit for carrying out temperature adjustment of the first and second metal molds 104, 105. In this case, this temperature adjustment circuit does not serve to directly control temperatures of the stampers 106, 107 affixed on the first and second metal molds 104, 105. For this reason, precise temperature control of the stampers 106, 107 cannot be carried out. Therefore, there is the possibility that thermal deformation may be caused to take place at the time of molding of the disc substrate 101 so that degradation in accuracy of the uneven patterns transferred and formed with respect to the disc substrate 101 molded by these stampers 106, 107 is caused to take place, and warp or waviness, etc. may be caused to take place at the disc substrate 101.

DISCLOSURE OF THE INVENTION

An object of this invention is to provide a disc substrate molding metal mold apparatus capable of molding disc substrate consisting of synthetic resin smoothed with extremely high accuracy without allowing warp or waviness to take place, and a method of manufacturing such a metal mold apparatus.

Another object of this invention is to provide a disc substrate molding metal mold apparatus which can carry out molding of disc substrate constituting disc capable of realizing protection of the magnetic head scanning on the disc surface where information signals are recorded, and a method of manufacturing such a metal mold apparatus.

A further object of this invention is to provide a disc substrate molding metal mold apparatus capable of forming recording tracks formed at the disc substrate with circularity of high accuracy, and a method of manufacturing such a metal mold apparatus.

A still further object of this invention is to provide a disc substrate molding metal mold apparatus which can carry out molding of uneven pattern formed at the surface of the disc substrate with high accuracy, and a method of manufacturing such a metal mold apparatus.

This invention is directed to a disc substrate molding metal mold apparatus adapted for molding synthetic resin material to carry out molding of disc substrate of an information signal recording medium. This metal mold apparatus comprises a first metal mold serving as the fixed side and a second metal mold serving as the movable side which are adapted so that they are butted to each other to constitute a molding portion for carrying out molding of disc substrate, wherein metallic smoothing layer is integrally formed at the molding plane surface side of at least one of the first and second metal molds.

The smoothing layer formed at the molding surface side of at least one of the first and second metal molds is formed by plating, sputtering or depositing metallic material including at least one kind selected from iridium and titanium at the molding plane surface of at least one of the first and second metal molds.

The metal mold apparatus according to this invention is manufactured by integrally forming smoothing layer of metal at the molding plane surface side of at least one of the first metal mold serving as the fixed side and the second metal mold serving as the movable side which are adapted so that they are butted to each other to constitute the molding portion for molding disc substrate thereafter to polish the surface of the smoothing layer.

The disc substrate of synthetic resin molded or formed by using the first and second metal molds in which smoothing layers are respectively integrally formed at the molding plane surfaces is formed in the state smoothed with high accuracy without allowing waviness or very small projection, etc. to take place at the surface thereof.

Another disc substrate molding metal mold apparatus according to this invention is adapted so that, at the molding surface side of at least one of the first and second metal molds, there is formed an pattern area for forming uneven pattern formed at the disc substrate to be molded or formed. In the pattern area, there is formed uneven pattern including at least one kind of uneven pattern corresponding to information signals, uneven pattern corresponding to control signals, and uneven pattern indicating recording tracks which are formed at the disc substrate to be molded or formed.

The uneven pattern formed in the pattern area formed at each molding plane surface side of the first and/or second metal molds is formed at the metallic layer formed at each molding plane surface of the first and/or second metal molds. The metallic layer in which this uneven pattern is formed is formed by plating, sputtering or depositing metallic material including at least one kind selected from iridium and titanium at each molding plane surface of the first and/or second metal molds.

Further, the disc substrate molding metal mold apparatus according to this invention comprises temperature control means for controlling temperatures of the first and/or second metal molds which are adapted so that they are butted to each other to constitute the molding portion for molding disc substrate. When synthetic resin material is cooled and solidified, this temperature control means controls temperature of the metal mold so as to take value of $(Tg-24)°$ C. or more. In this case, Tg is glass transition temperature of the synthetic resin material.

The temperature control means comprises a circulation path for cooling through which cooling liquid is circulated, which is formed at least one of the first and second metal molds, and a cooling unit for cooling the cooling liquid circulated through the cooling circulation path.

A disc substrate molding metal mold apparatus provided with a first metal mold serving as the fixed side and a second metal mold serving as the movable side which are adapted so that they are butted to each other to constitute a molding portion for molding disc substrate, and such that a pattern area for molding uneven pattern formed at the disc substrate to be molded or formed is formed at the molding plane surface side of at least one of the first and second metal molds is manufactured after undergone the following process steps. Namely, this method of manufacturing the metal mold comprises: a packing member fitting step of fitting, with respect to at least one metal mold in which a pattern area is formed, a packing shaft into its center hole in such a manner that the front end portion thereof constitutes plane substantially flush with the molding plane surface, and of fitting an outer circumferential packing member with respect to the outer circumferential portion thereof in such a manner that the front end surface thereof constitutes plane substantially flush with the molding plane surface; a photosensitive resist costing step of coating photosensitive resist on the molding plane surface surrounded by the outer circumferential packing member to form a photosensitive resist layer; a cutting step of irradiating light beams onto the photosensitive resist layer in correspondence with uneven pattern, etc. formed at a disc shaped recording medium to allow a portion of this photosensitive resists layer to be exposed to light to form latent image pattern; a development step of developing the photosensitive resist layer to form, at the molding plane surface, uneven pattern in which the latent image pattern has been actualized; an etching step of implementing etching processing to the first metal mold to thereby form, at the molding plane surface, very small recessed portions in correspondence with the uneven patterns formed at a disc-shaped recording medium; a cleaning step of removing the photosensitive resist layer from the molding plane surface; and a packing member detachment step of detaching the packing shaft and the outer circumferential packing member from the first metal mold.

This manufacturing method for metal mold apparatus further comprises, between the packing member fitting step and the photosensitive resist coating step, a metallic film formation step of forming, with respect to at least one metal mold in which the packing shaft is fitted into the center hole and the outer circumferential packing member is fitted with respect to the outer circumferential portion by the packing member fitting step, a metallic film layer at the molding surface thereof; and metal film polishing step of implementing polishing processing to the metal film layer to form smooth photosensitive resist coating surface.

A disc substrate according to this invention is molded by injecting synthetic resin material at the molding portion of a metal mold apparatus comprising a first metal mold serving as the fixed side and a second metal mold serving as the movable side which are adapted so that they are butted to each other to constitute a molding portion for molding disc substrate, and such that, at the molding surface side of at least one of the first and second metal molds, a smoothing layer of metal is integrally formed. This disc substrate is molded by the metal mold apparatus in which the smoothing layer of metal is integrally formed at the molding surface side of at least one of the first and second metal molds, whereby smoothness of the surface portion on which the magnetic head scans exhibits extremely high accuracy.

This disc substrate is characterized in that height from the disc substrate average plane of projection-shaped waviness within projected area where floating type magnetic head is projected onto the surface thereof is lower than floating height of the floating type magnetic head with respect to the disc substrate average plane. The height of the projection-shaped waviness is caused to be 80% or less of the floating height of the floating type magnetic head.

In addition, a disc substrate of this invention is molded by a metal mold apparatus comprising a first metal mold serving as the fixed side and a second metal mold serving as the movable side which are adapted so that they are butted to each other to constitute a molding portion for molding disc substrate, and such that a pattern area for forming uneven pattern formed at the disc substrate to be molded or formed is formed at the molding plane surface side of at least one of the first and second metal molds; and is disc substrate for disc-shaped recording medium in which recording and/or reproduction of information signals are carried out by the floating type magnetic head floating with respect to the disc average plane. This disc substrate is adapted so that height from the disc substrate average plane of projection-shaped waviness within the projected area where the floating type magnetic head is projected onto the disc substrate surface is caused to be lower than floating height of the floating type magnetic head with respect to the disc substrate average plane.

BEST MODE FOR CARRYING OUT THE INVENTION

A metal mold unit for molding disc substrate, a method of manufacturing such metal mold unit, and a disc substrate manufactured by the metal mold unit will now be described in more practical sense with reference to the attached drawings.

Initially, metal mold unit for molding disc substrate having plane surface where uneven pattern corresponding to information signal or control signal is not formed on the surface will be described.

Figure 9:
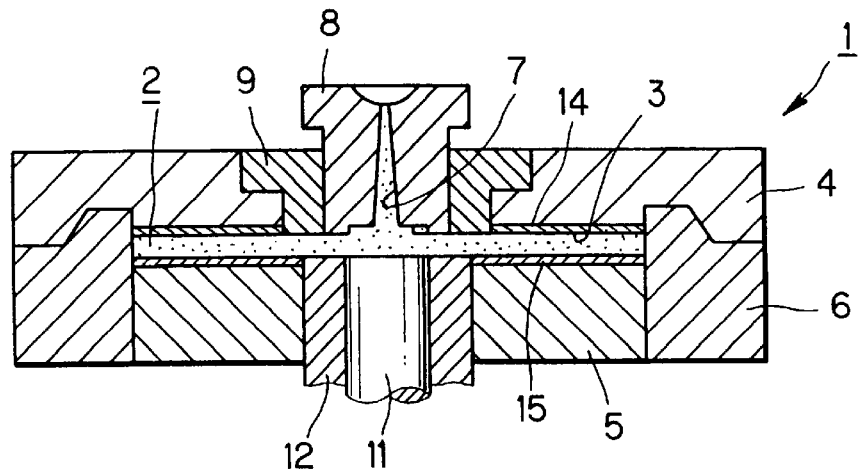
FIG. 9 is a cross sectional view showing a metal mold apparatus for molding disc substrate according to this invention.

This metal mold unit 1 comprises, as shown in FIG. 9, a first metal mold 4 serving as the fixed side and a second metal mold 5 serving as the movable side which are adapted so that they are butted to each other to constitute a cavity 3 constituting a molding portion for molding a disc substrate 2. At the outer circumferential side of the second metal mold 5, a ring-shaped outer circumferential side metal mold 6 which forms the outer circumferential surface of the disc substrate 2 to be molded or formed is fitted.

Further, at the central portion of the first metal mold 4, a sprue bush 8 in which a nozzle 7 for filling synthetic resin material in molten state constituting the disc substrate 2 into the cavity 3 is formed is disposed through an attachment member 9.

In addition, at the central portion of the second metal mold 5, there are disposed a punch 11 for forming center hole at the disc substrate 2 molded within the cavity 3, and a ring-shaped eject member 12 within which this punch 11 is accommodated so that it can be advanced or withdrawn. This eject member 12 is used for detaching the disc substrate 2 molded by this metal mold unit 1 from the cavity 3.

At the disc molding plane surface side constituting the cavity 3 of the first and second metal molds 4, 5 constituting the metal mold unit 1 according to this invention, metallic smoothing layers 14, 15 are integrally formed. These smoothing layers 14, 15 are formed by plating, sputtering or depositing metallic material onto the disc molding plane surface of the first and second metal molds 4, 5. In addition, as material constituting the smoothing layers 14, 15, there is used metal including at least one kind selected from iridium and titanium.

The process for manufacturing the first and second metal molds 4, 5 in which the smoothing layers 14, 15 are provided will now be described.

Figure 10:
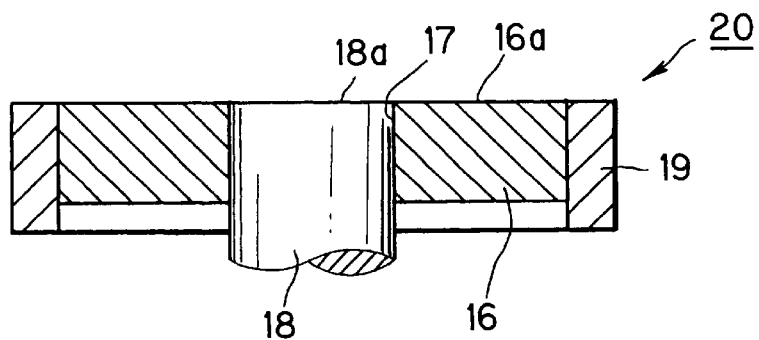
FIG. 10 is a cross sectional view showing the state where metal mold constituting the metal mold apparatus according to this invention is formed.

In order to form these metal molds 4, 5, metal mold material 16 consisting of metal such as stainless steel, etc. serving as base material of these metal molds 4, 5 is prepared. Disc molding surface 16a side of this metal mold material 16 is polished or abrasion-processed with high accuracy so that it is flattened. Moreover, at the central portion of the metal mold material 16, as shown in FIG. 10, there is bored a center hole 17 at which an attachment member 9 for attaching the sprue bush 8 or the punch 11 is disposed. As shown in FIG. 10, a packing shaft 18 is fitted into this center hole 17 in order to flatten the disc molding surface 16a side of the metal mold material 16. Fitting of this packing shaft 18 is carried out by shrinkage fitting to heat the metal mold material 16 to carry out fitting. By heating the metal mold material 16 to enlarge the diameter of the center hole 17, it is possible to easily fit the packing shaft 18 having the same diameter as that of the center hole 17.

Figure 11:
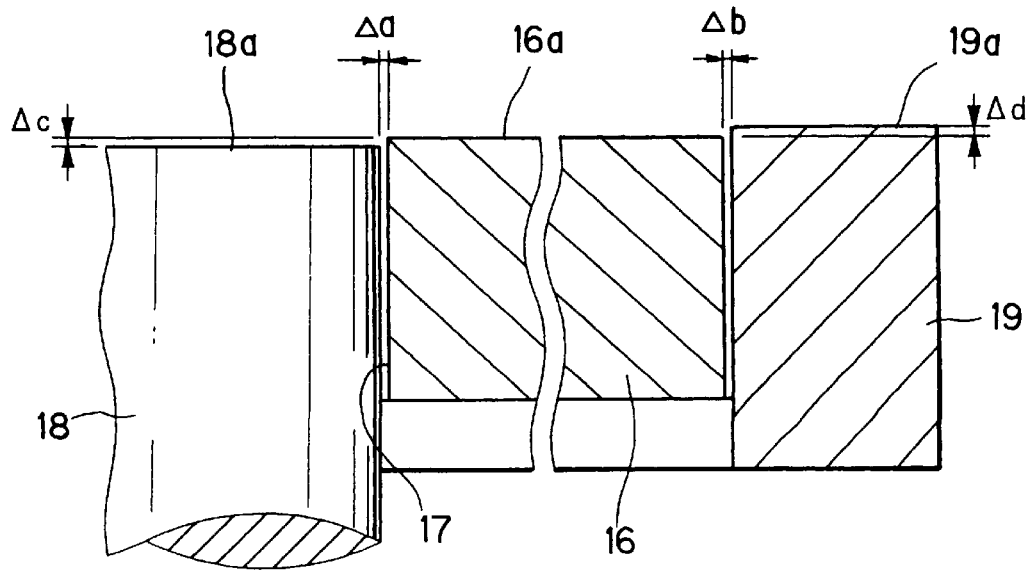
FIG. 11 is an essential part cross sectional view showing disc molding plane surface of metal mold intermediate body for molding metal mold.

The packing shaft 18 is formed by metallic material which has abrasion resistance equivalent to that of the metal mold material 16, is difficult to be damaged and is firm, and is formed so that it has the same diameter as that of the center hole 17 of the metal mold material 16 at ordinary temperature. The packing shaft 18 is fitted into the central hole 17 in such a manner that its front end surface 18a constitutes plane flush with the disc molding plane surface 16a of the metal mold material 16. The packing shaft 18 is tightly fitted into the center hole 17 as the result of the fact that heated metal mold material 16 is cooled so that the diameter of the center hole 17 is reduced. Thus, slipping off thereof is prevented. In more practical sense, the packing shaft 18 is formed so that when it is attached to the metal mold material 16, offset $\Delta c$ taking place between its front end surface 18a and disc molding plane surface 16a and gap $\Delta a$ between the outer circumferential surface and the inner circumferential surface of the center hole 17 are caused to be respectively 2 $\mu$m or less as shown in FIG. 11.

Moreover, at the outer circumferential side of the metal mold material 16, a ring-shaped outer circumferential packing member 19 is fitted. Fitting of this outer circumferential packing member 19 is carried out by shrinkage fitting to carry out heating to conduct fitting. Namely, the outer circumferential packing member 19 is heated so that the inner diameter is enlarged, thus making it possible to fit it with respect to the outer circumferential side of the metal mold material 16.

The outer circumferential packing member 19 is formed by metallic material which has abrasion resistance equivalent to that of the of the metal mold material 16, is difficult to be damaged and is firm, and is formed so as to have the inner diameter which is the same as the outer diameter of the metal mold material 16 at ordinary temperature. Further, the outer circumferential packing member 19 is fitted with respect to the outer circumferential side of the metal mold material 16 in such a manner that its front end surface 19a constitutes the plane flush with the disc molding surface 16a. The outer circumferential packing member 19 is heated and is then cooled so that its diameter is reduced. The diameter-shrunk outer circumferential packing member 19 is tightly fitted with respect to the outer circumferential side of the metal mold material 16. Thus, slipping off thereof is prevented. In more practical sense, the outer circumferential packing member 19 is formed so that when it is attached to the metal mold material 16, offset $\Delta d$ taking place between its front end surface 19a and the disc molding surface 16a and gap $\Delta b$ taking place between the inner circumferential surface and the outer circumferential surface of the metal mold material 16 are caused to be respectively 2 $\mu$m or less as shown in FIG. 11.

Figure 12:
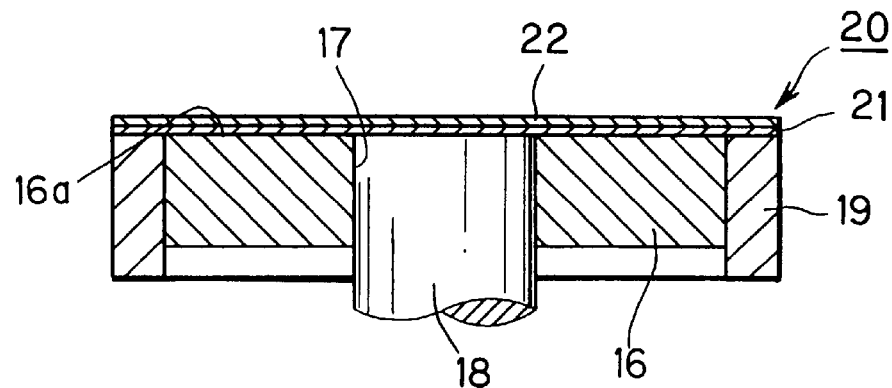
FIG. 12 is a cross sectional view showing the state where metallic film is formed on disc molding plane surface of the metal mold intermediate body.
Figure 13:
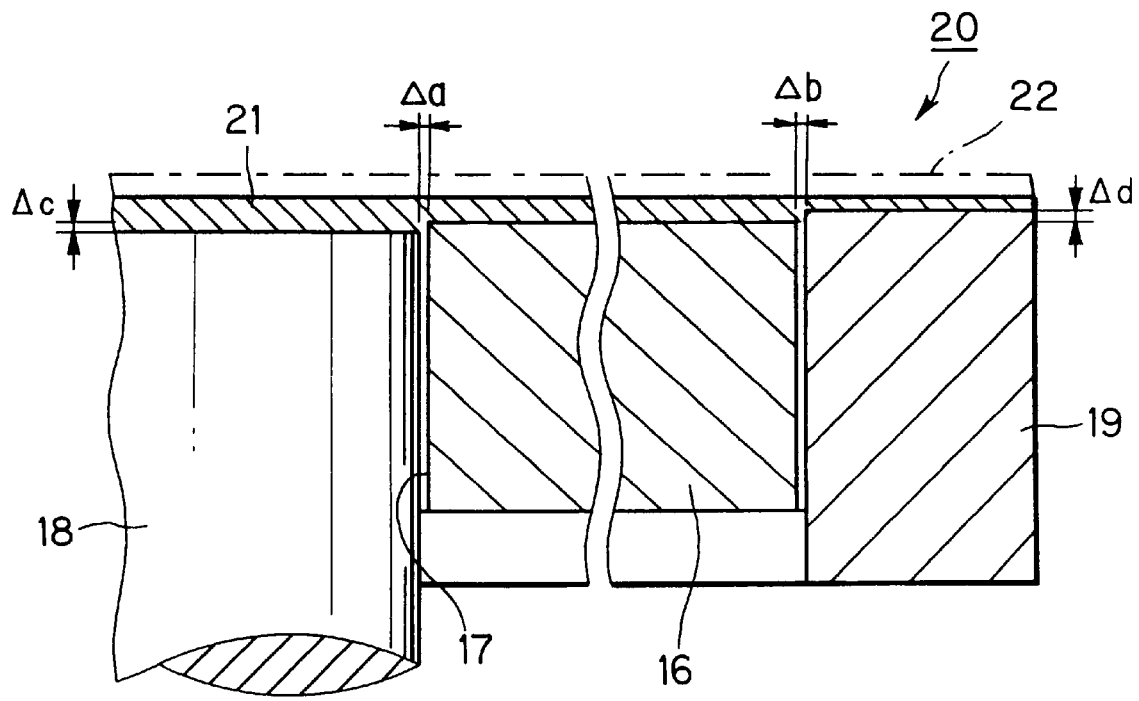
FIG. 13 is an essential part cross sectional view showing the state where metallic film is formed on the disc molding plane surface of the metal mold intermediate body.

By fitting the packing shaft 18 into the central hole 17 of the metal mold material 16 to fit the outer circumferential packing member 19 with respect to the outer circumferential side, a metal mold intermediate body 20 is constituted. At the surface side to which the disc molding plane surface 16a faces of the metal mold intermediate body 20, there is formed a metallic film 21 constituting each of the smoothing layers 14, 15 when the first metal mold 4 or the second metal mold 5 is constituted as shown in FIGS. 12 and 13. This metallic film 21 is formed as shown in FIG. 13 so as to have thickness sufficient to fill up the respective offsets $\Delta c$, $\Delta d$ and the respective gaps Δa, Δb taking place at the surface side where the disc molding plane surface 16a faces of the metal mold intermediate body 20 to flatten or planarized the disc molding plane surface 16a side of the metal mold intermediate body 20. In more practical sense, the metallic film 21 is formed so that its thickness is equal to 5 μm to 10 μm.

The metallic film 21 is formed by iridium or titanium, alloy of iridium, or alloy of titanium. In practically forming this metallic film 21, it is formed by plating, sputtering or depositing iridium, titanium, alloy of iridium or alloy of titanium. This metallic film 21 is polished after it is formed on the disc molding plane surface 16a side of the metal mold intermediate body 20 so that the surface of the unit is flattened with high accuracy. Namely, the metallic film 56 is polished in such a manner that offset Δc taking place between front end surface 18a of the packing shaft 18 and the disc molding plane surface 16a and offset Δd taking place between front end surface 19a of the outer circumferential packing member 19 and the disc molding plane surface 16a are corrected so that the disc molding plane surface 16a results in the plane surface having no rising portion and flattened or planarized with extremely high accuracy equivalent to the glass base. In more practical sense, the metallic film 56 is polished so that the thickness becomes equal to 3 μm to 5 μm over the entirety.

Further, with respect to the metal mold intermediate body 20, unnecessary portion of the metallic layer 21 formed at the disc molding plane surface 16a side is removed, whereby the first or second metal mold 4 or 5 smoothed with high accuracy at the disc molding plane surface side is formed.

Removal of the unnecessary portion of the metallic film 21 is carried out by etching. In order to carry out such etching, an approach is employed as shown in FIG. 12 to deposit a photosensitive resist layer 22 on the surface of the metallic film 21 to irradiate light beams such as ultraviolet rays, etc. onto this photoresist layer 22 to allow the unnecessary portion of the metallic film 21 to be exposed to light. Then, the exposed portion is removed by etching, whereby the unnecessary portion of the metallic film 21 is removed. Thereafter, both the packing shaft 18 and the outer circumferential packing member 19 are detached from the metal mold material 16, whereby the first or second metal mold 4, 5 is formed. These first and second metal molds 4, 5 respectively comprise smoothing layers 14, 15 comprised of metallic film on the disc molding plane surface constituting at least the cavity 3.

The disc molding plane surfaces of the first and second metal molds 4, 5 provided with the smoothing layers 14, 15 formed by such process are flattened or planarized with extremely high accuracy.

Figure 14:
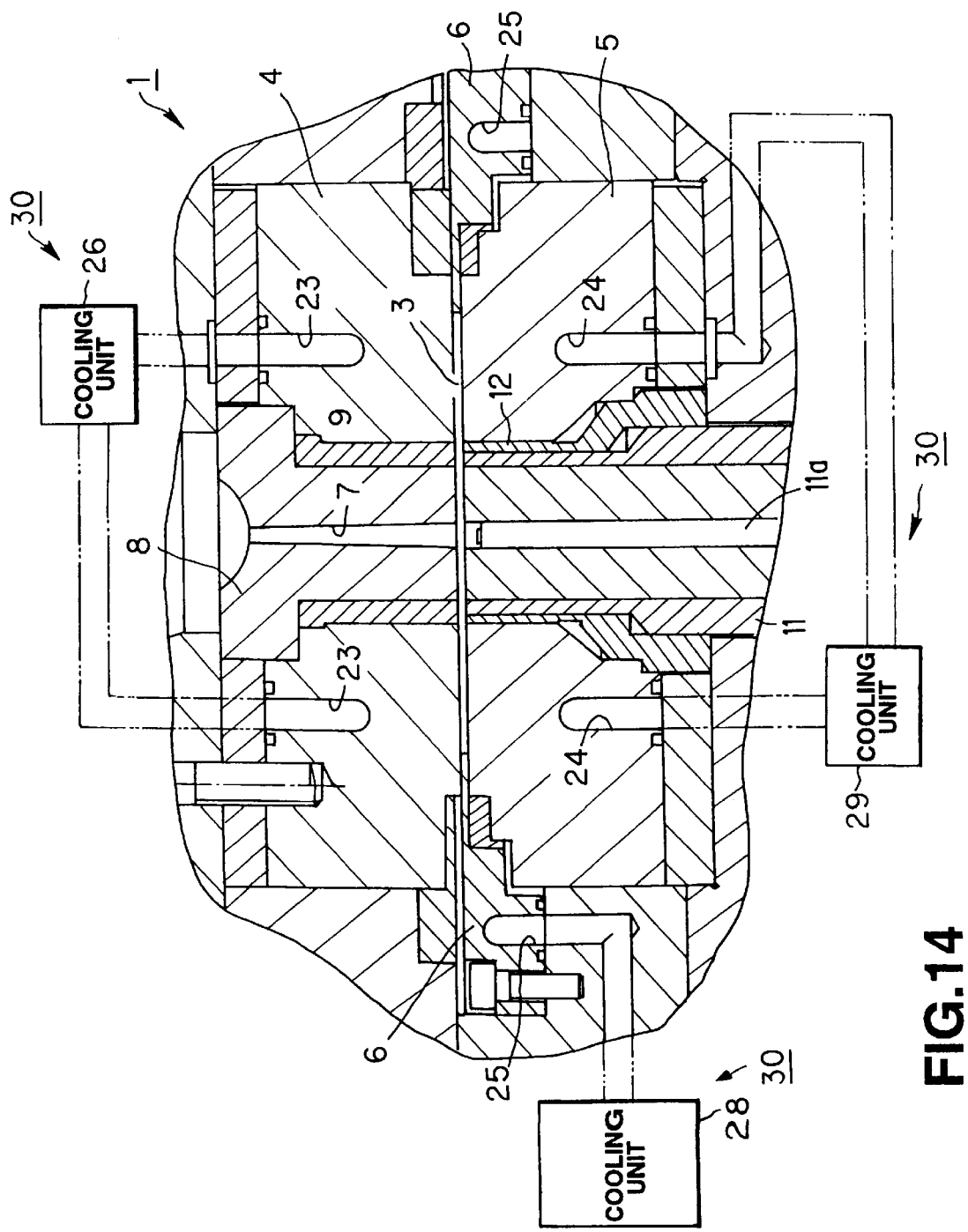
FIG. 14 is a cross sectional view showing metal mold apparatus according to the invention in which temperature adjustment mechanism is assembled.

In the metal mold unit 1 provided with first and second metal molds 4, 5 as described above, there is provided a temperature control mechanism 22 for controlling temperatures of the first and second metal molds 4, 5. This temperature control mechanism 22 is composed, as shown in FIG. 14, of cooling circulation paths 23, 24, 25 formed by boring the first and second metal molds 4, 5 and the outer circumferential side metal mold 6 and adapted so that cooling liquids such as cooling oil, etc. are circulated therethrough, and cooling units 26, 27, 28 for adjusting temperatures of cooling liquids circulated through these cooling circulation paths 23, 24, 25. The cooling units 26, 27, 28 are respectively provided with temperature adjustment mechanisms (not shown) for adjusting temperatures of cooling liquids, and serve to independently circulate, at predetermined temperatures, respective cooling liquids circulated through the first and second metal molds 4, 5 and the outer circumferential side metal mold 6 by these temperature adjustment mechanisms. In addition, these cooling units 26, 27, 28 respectively independently control temperatures of the first and second metal molds 4, 5 and the outer circumferential side metal mold 6 through respective cooling liquids so that their temperatures are equal to (Tg−24)° C. or more.

In this case, gT is glass transition temperature of synthetic resin material filled into the metal mold unit 1. In the case where, e.g., amorphous polyolefine is used as material constituting the disc substrate 2, since glass transition temperature Tg of this synthetic resin is 138° C., temperatures of the first and second metal molds 4, 5 and the outer circumferential side metal mold 6 are controlled so that their temperatures become equal to 114° C. Namely, temperatures of the first and second metal molds 4, 5 and the outer circumferential metal mold 6 are controlled so that they are equal to 114° C. or more when the injected and filled synthetic resin material is cooled and solidified.

As the result of the fact that the first and second metal molds 4, 5 and the outer circumferential metal mold 6 are subjected to temperature control in this way, molding or forming can be carried out without allowing distortion such as molding distortion, etc. at the disc substrate 2 to be molded or formed.

As long as the temperature control mechanism 22 can control the peripheral portion of the cavity 3 so that its temperature is equal to (Tg−24)° C. or more, it is sufficient to provide such mechanisms at the first and second metal molds 4, 5 or to provide such mechanism at either one of metal molds 4, 5.

In this example, in the metal mold unit 1 shown in FIG. 14, at the central portion of the punch 11, there is disposed a thrust pin 11a for removing punch refuse punched by the punch 11 so that it can be advanced and withdrawn.

In forming or molding the disc substrate 2 by the metal mold unit 1 having configuration as described above, synthetic resin material in molten state is filled into the cavity 3 through the nozzle 7 of the sprue bush 8 in the mold-clamped state where the first and second metal molds 4, 5 are butted to each other. The punch 11 is protruded into the cavity 3 in the state where the synthetic resin filled within the cavity 3 is semi-hardened to form center hole at the disc substrate 2 to be molded or formed. Thereafter, in the metal mold unit 1, the second metal mold 5 constituting the movable side is caused to undergo such an operation to be spaced relative to the first metal mold 4 so that mold opening operation is carried out. Thus, molding of the disc substrate 2 is carried out. In this case, since disc substrate 2 to be molded is molded within the cavity 3 constituted by the first and second metal molds 4, 5 in which the smoothing layers 14, 15 are respectively formed, the surface of the disc substrate 2 is flattened with extremely high accuracy. Further, since there is carried out cooling/solidification of the disc substrate 2 molded in the state where temperature of the peripheral portion of the cavity 3 is controlled by the temperature control mechanism 22 at the time of molding of the disc substrate 2 so that its temperature is equal to (Tg−24)° C. or more, the disc substrate 2 can be molded or formed without allowing distortion such as molding distortion, etc. to take place.

Accordingly, when disc substrate 2 molded or formed in this case is disc substrate for magnetic disc, height from the disc substrate average plane surface of projection-shaped waviness within the projected area where the floating type magnetic head is projected onto the surface of the disc substrate 2 is caused to be lower than the floating height of the floating type magnetic head with respect to the disc substrate average plane surface. In addition, height of the projection-shaped waviness can be held down to 80% or less of the floating height of the floating type magnetic head.

While, in the above-described metal mold unit 1, the disc substrate 2 to be molded or formed is molded or formed so that both surfaces of the disc substrate 2 are caused to be respectively high accuracy smoothing surfaces, in the case where when this disc substrate 2 is used to constitute the disc-shaped recording medium, signal recording layer is formed only on one surface, the smoothing layer 14, 15 may be formed at only either one corresponding molding plane surface of the first and second metal molds 4, 5. In this case, either the other molding plane surface of the first and second metal molds 4, 5 in which smoothing layer 14, 15 is not formed is caused to be flat surface in which polishing has been implemented.

While explanation has been given in the above-described embodiment by taking the example of the metal mold unit 1 for molding disc substrate having flat surfaces where uneven pattern corresponding to information signal or control signal is not formed on its surface, the example of metal mold unit 31 for molding disc substrate where uneven pattern corresponding to information signal or control signal is formed on its surface will now be described.

Figure 15:
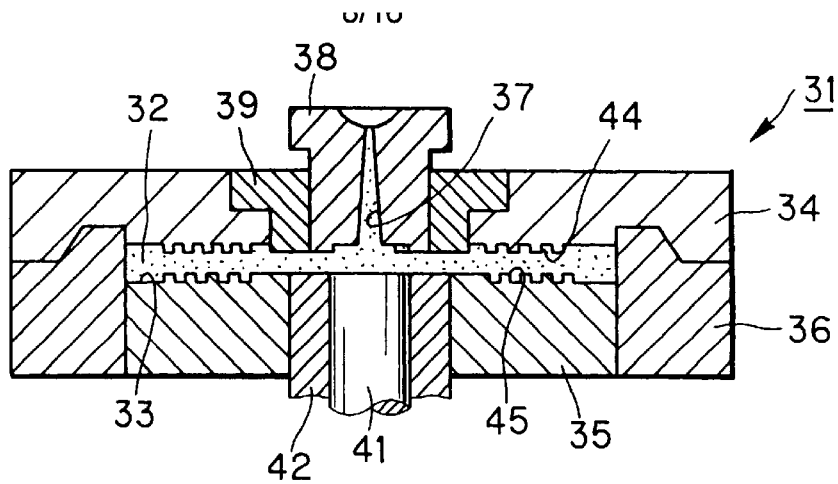
FIG. 15 is a cross sectional view showing the metal mold apparatus according to the invention in which uneven pattern is formed on the disc molding plane surface of the metal mold.

This metal mold unit 31 comprises, as shown in FIG. 15, a first metal mold 34 serving as the fixed side and a second metal mold 35 serving as the movable side which are adapted so that they are butted to each other to constitute a cavity 33 constituting the molding portion which carries out molding of disc substrate 32. At the outer circumferential side of the second metal mold 35, a ring-shaped outer circumferential side metal mold 36 which forms the outer circumferential surface of disc substrate 32 to be molded or formed is fitted.

Further, at the central portion of the first metal mold 34, a sprue bush 38 in which a nozzle 37 for filling synthetic resin material in molten state constituting the disc substrate 32 into the cavity 33 is formed is disposed through an attachment member 39.

In addition, at the central portion of the second metal mold 35, there are disposed a punch 41 for forming center hole at the disc substrate 32 molded within the cavity 33, and a ring-shaped eject member 42 within which this punch is accommodated so that it can be advanced or withdrawn. This eject member 42 is used for detaching the disc substrate 32 molded or formed by this metal mold unit 31 from the cavity 33.

At the disc molding plane surface sides constituting the cavity 33 of the first and second metal molds 34, 35 constituting the metal mold unit 31 according to this invention, there are directly formed uneven patterns 44, 45 for forming uneven pattern corresponding to information signal or control signal or uneven pattern constituting recording track recorded on magnetic disc formed by using disc substrate 32 to be molded or formed at the disc molding plane surfaces. These uneven patterns 44, 45 are caused to be of the structure in which very small uneven portions having pitch, size and depth of several 10 nm to several 100 nm are formed in concentrical or spiral form, or are formed radially in a manner ranging from the inner circumferential side toward the outer circumferential side.

The process for manufacturing the first and second metal molds 34, 35 in which uneven patterns 44, 45 are directly formed at the disc molding plane surface sides will now be described with reference to the process diagram of FIG. 16.

In order to form these metal molds 34, 35, metal mold material 46 consisting of metal such as stainless steal, etc. serving as base material of these metal molds 34, 35 is prepared. As shown in FIG. 16, at metal mold preparatory machining process of step ($S_1$), the configuration necessary as metal mold is formed with respect to this metal mold material 46 by machining. At this time, the disc molding plane surface 46a side of the metal mold material 46 is abrasion-processed with high accuracy so that it is flattened. In addition, at the central portion of the metal mold material 46, there is bored, as shown in FIG. 17, a center hole 47 in which an attachment member 39 for attaching a sprue bush 38 or a punch 41 is disposed. As shown in FIG. 17, in order to flatten the molding plane surface 46a side of the metal mold material 46, a packing shaft 48 is fitted into this center hole 47. Fitting of this packing shaft 48 is carried out by shrinkage fitting to heat the metal mold material 46 to carry out fitting thereof.

Figure 16:
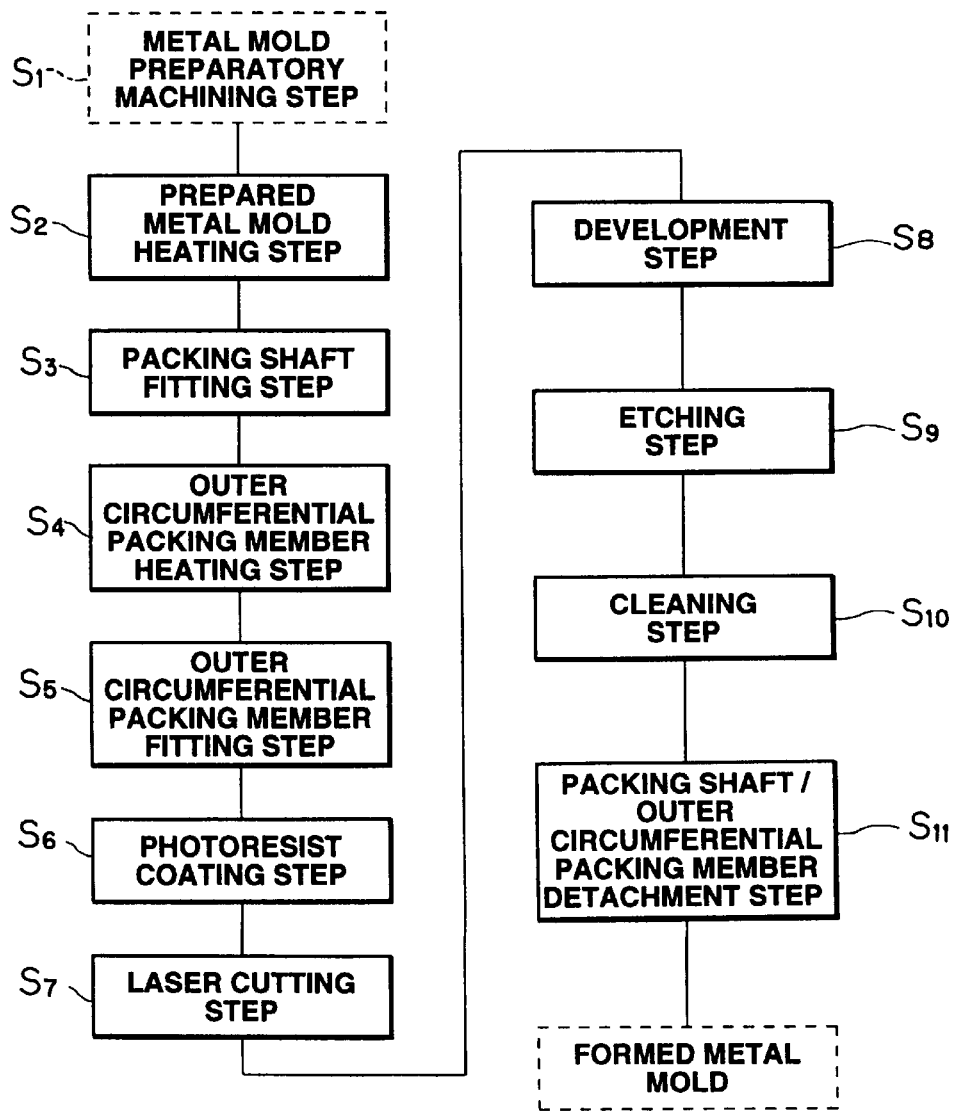
FIG. 16 is a process diagram showing process steps for molding metal mold in which uneven pattern is provided.
Figure 17:
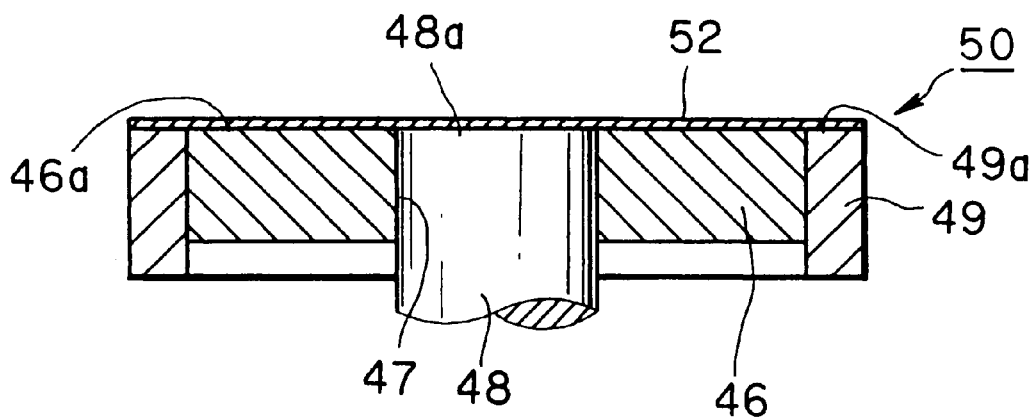
FIG. 17 is a cross sectional diagram of metal mold intermediate body showing the state where photosensitive resist layer is formed on disc molding surface of metal mold intermediate body for molding metal mold.

In order to carry out fitting of this packing shaft 48, the metal mold material 46 is heated at the prepared metal mold heating process of step 2 ($S_2$) as shown in FIG. 16. The metal mold material 46 is heated so that the diameter of the center hole 17 is enlarged. Then, at packing shaft fitting process of step 3 ($S_3$), the packing shaft 48 is fitted into the center hole 47 as shown in FIG. 17. At this time, since the metal mold material 46 is heated so that the diameter of the central hole 17 is enlarged, it is possible to easily fit the packing shaft 48 having the same diameter as that of the center hole 47.

In this case, the packing shaft 48 is formed by metallic material which has abrasion resistance equivalent to the metal mold material 46, is difficult to be damaged and is firm, and is formed so as to have the same diameter as that of the center hole 47 of the metal mold material 46 at ordinary temperature. The packing shaft 48 is fitted into the center hole 47 in such a manner that its front end surface 48a constitutes the plane flush with the forming molding plane surface 46a of the metal mold material 46. The packing shaft 48 is tightly fitted into the center hole 47 as the result of the fact that the heated metal mold material 46 is cooled so that the diameter of the center hole 47 is shrunk or reduced. Thus, slipping off thereof is prevented.

In more practical sense, the packing shaft 48 is fitted so that when it is attached to the metal mold material 46, offset taking place between front end surface 48a and molding plane surface 46a is caused to be 2 μm or less.

Then, as shown in FIG. 17, a ring-shaped outer circumferential packing member 49 is fitted with respect to the outer circumferential side of the metal mold material 46. Fitting of this outer circumferential packing member 49 is carried out by shrinkage fitting to heat the outer circumferential packing member 49 to carry out fitting thereof. Namely, the outer circumferential packing member 49 is heated at outer circumferential packing member heating process of step 4($S_4$) shown in FIG. 16. The outer circumferential packing member 49 is heated so that the inner diameter is enlarged. Thus, the outer circumferential packing member 49 can be easily fitted with respect to the outer circumferential side of the metal mold material 46.

The outer circumferential packing member 49 is formed by metallic material which has abrasion resistance equivalent to the metal mold material 46, is difficult to be damaged and is firm, and is formed so as to have inner diameter which is the same as the outer diameter of the metal mold material 46 at ordinary temperature. Further, the outer circumferential packing member 49 is fitted with respect to the outer circumferential side of the metal mold material 46 in such a manner that front end surface 49a constitutes the plane flush with the molding plane surface 46a at the outer circumferential packing member fitting process of step 5 ($S_5$) shown in FIG. 16. The outer circumferential packing member 49 is heated and is then cooled so that its diameter is reduced. The diameter reduced outer circumferential packing member 49 is tightly fitted with respect to the outer circumferential side of the metal mold material 46. Thus, slipping off thereof is prevented. In more practical sense, the outer circumferential packing member 49 is fitted in such a manner that when it is attached to the metal mold material 46, offset taking place between its front end surface 49a and the molding plane surface 46a is caused to be 2 μm or less.

By fitting the packing shaft 48 into the center hole 47 of the metal mold material 46 to fit the outer circumferential packing member 49 with respect to the outer circumferential side in this way, metal mold intermediate body 50 is constituted. In this metal mold intermediate body 50, the molding face 46a side is flattened as the result of the fact that the center hole 47 is packed or clogged by the packing shaft 48, and the diameter thereof is enlarged as the result of the fact that the outer circumferential packing member 49 is fitted with respect to the outer circumferential side. Namely, the molding metal mold intermediate body 50 is constituted in such a manner that the molding plane surface 46a is flattened over the entire area and data recording area formed on the disc substrate 32 to be molded or formed has sufficiently broad area.

Then, at photo-resist coating process of step 6 ($S_6$) shown in FIG. 16, photo-resist layer 52 is formed at the molding plane surface 46a side of the molding metal mold intermediate body 50 as shown in FIG. 17. This photo-resist layer 52 is formed by dropping photo-resist in liquid state at the central portion of the surface thereof in the state where the molding metal mold intermediate body 50 is mounted on rotary table (not shown) and is rotated. Namely, the photo-resist dropped on the surface of the rotating molding metal mold intermediate body 50 is diffused toward the outer circumferential side along the molding plane surface 46a of the molding metal mold intermediate body 50 by centrifugal force. The photo-resist is diffused in uniform state over the entire surface of the molding plane surface 46a as the result of the fact that the molding plane surface 46a of the molding metal mold intermediate body 50 is flattened by the packing shaft 48 and the diameter thereof is enlarged by the outer circumferential packing member 49 as described above, thus to constitute a photo-resist layer 52. The photo-resist layer 52 is formed so as to have substantially uniform thickness without molding rising portion at the periphery of the center hole 47 or the outer circumferential side which forms the outer circumferential side of the data recording area.

The photo-resist layer 52 formed at the molding plane surface 46a of the molding metal mold intermediate body 50 is exposed to light at laser cutting process of step 7 ($S_7$) shown in FIG. 16. Thus, latent image of the uneven pattern is formed. This laser cutting process step is the process step for carrying out irradiation of laser beams in correspondence with the uneven pattern which constitutes the signal recording portion where various information signals are recorded, formed on the magnetic disc constituted by using the disc substrate 32 molded here to allow the photo-resist layer to be exposed to light to form latent image of the uneven pattern. Latent image of this uneven pattern is actualized as the result of the fact that the photo-resist layer 52 is caused to undergo development processing at the development process of the subsequent step 8 ($S_8$) to form uneven patterns 44, 45 at the photo-resist layer 52 formed on the disc molding plane surface 46a of the molding metal mold intermediate body 50.

Since the photo-resist layer 52 is formed on the disc molding plane surface 46a of the metal mold material 46 so as to have uniform thickness on the entire surface ranging from its center toward the outer circumferential side, precise and secure exposure is carried out by laser beams irradiated thereto. Accordingly, in the metal mold material 46, missing of pattern which is missing of uneven portions corresponding to information signals to be recorded in advance and/or occurrence of incomplete shape pattern resulting from insufficient exposure, etc. are prevented.

To the molding metal mold intermediate body 50 to which latent image of the uneven pattern has been implemented to the photo-resist layer 52 by irradiation of laser beams, etching is implemented at the etching process of the step 9 ($S_9$) shown in FIG. 16. Namely, etching processing is implemented to the disc molding plane surface 46a of the molding metal mold intermediate body 50 in which the photo-resist layer 52 to which latent image of the uneven pattern has been implemented is formed. At the disc molding plane surface 46a from which the photosensitive resist layer 52 has been removed by this etching processing, precise uneven patterns 44, 45 are directly engraved. Then, at the cleaning process of step S10 ($S_{10}$) shown in FIG. 16, the photosensitive resist layer 52 left at the disc molding plane surface 46a of the molding metal mold intermediate body 50 is removed.

Figure 18:
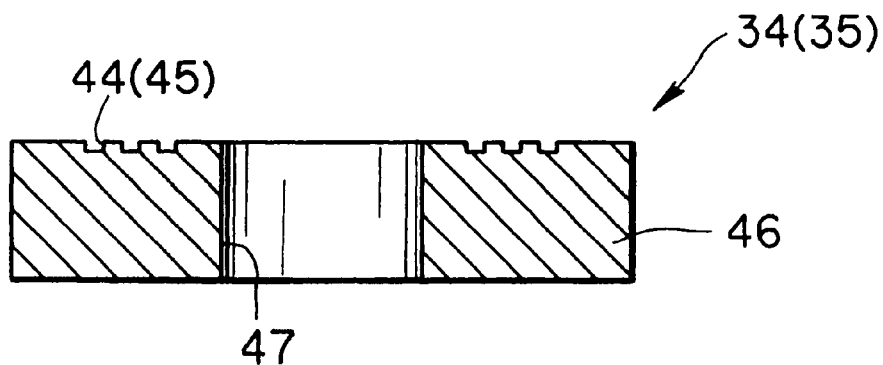
FIG. 18 is a cross sectional view showing metal mold in which uneven pattern is provided.

At the molding metal mold intermediate body 50, precise uneven patterns 44, 45 are formed at the disc molding plane surface 46a by the above-described process step. When the packing shaft 48 and the outer circumferential packing member 49 are detached from the metal mold material 46 by the packing shaft/outer circumferential packing member detachment process of step 11 ($S_{11}$) shown in FIG. 16, first or second metal mold 34 or 35 as shown in FIG. 18 is obtained. The first and second metal molds 34, 35 thus obtained are respectively completed. Namely, at the first and second metal molds 34, 35, as shown in FIG. 18, there are formed precise uneven patterns 44, 45 directly engraved in a range from the outer circumference of the center hole 47 toward the portion in the vicinity of the outer circumferential side. These first and second metal molds 34, 35 are adapted so that the outer circumferential side metal mold 36 is combined with respect to the outer circumferential side of the second metal mold 35 as described above, and are respectively assembled with respect to metal mold attachment plates (not shown) to constitute metal mold unit 31. The metal mold unit thus constituted is attached to disc substrate molder.

Figure 19:
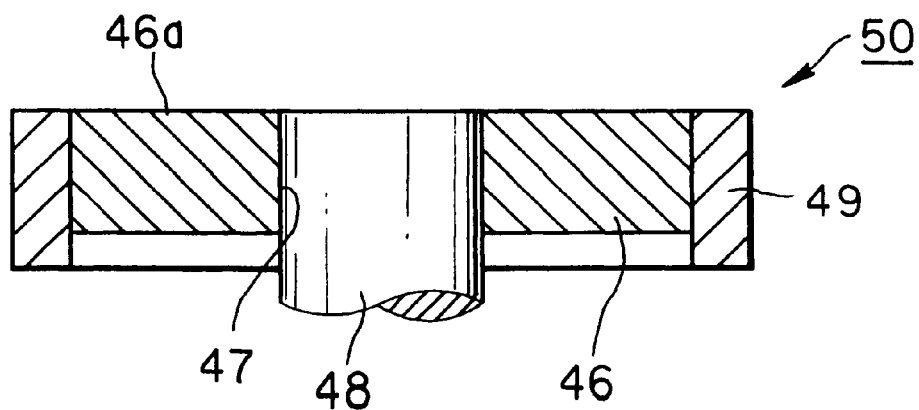
FIG. 19 is a cross sectional view of the metal mold intermediate body showing the state of the disc molding plane surface.
Figure 20:
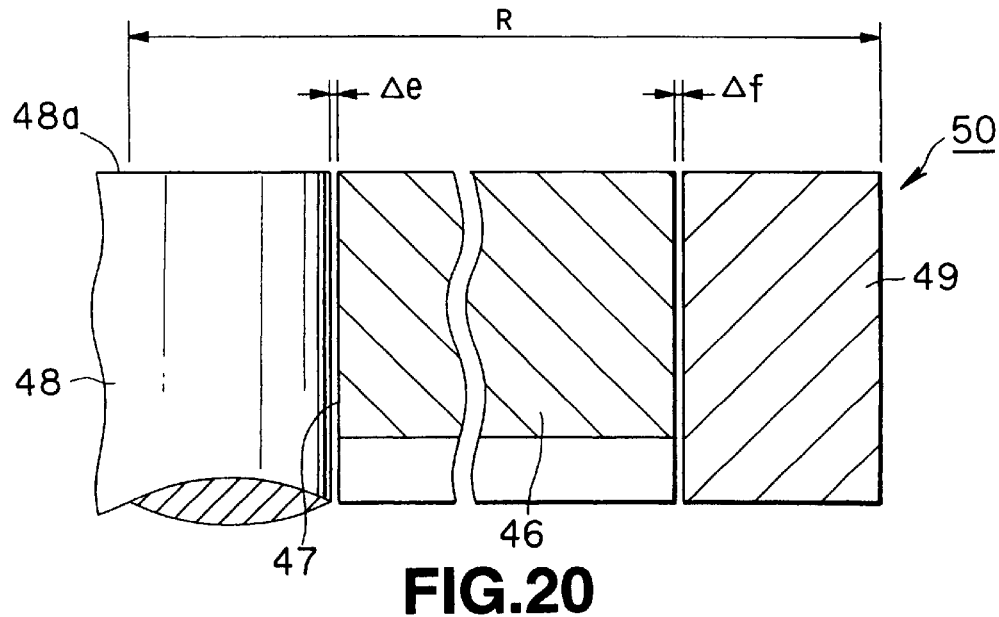
FIG. 20 is an essential part cross sectional view of the metal mold intermediate body showing offset taking place at the disc molding plane surface of the metal mold intermediate body.

Meanwhile, the first and second metal molds 34, 35 of the above-described embodiment are formed as described above by metal mold intermediate body 50 constituted by fitting the packing shaft 48 into the center hole 47 of the metal mold material 46 to fit the outer circumferential packing member 49 with respect to the outer circumferential side. At the surface side to which the disc molding plane surface 46a is faced of the metal mold intermediate body constituted in this way, as shown in FIGS. 19 and 20, gap Δe or offset takes place between the front end surface 48a of the packing shaft 48 and the center hole 47 of the metal mold material 46, and gap Δf or offset takes place also between the front end surface 49a of the outer circumferential packing member 49 and the disc molding plane surface 46a of the outer circumferential side of the metal mold material 46. For this reason, at the photosensitive resist layer 52 formed on the disc molding plane surface 46a of the molding metal mold intermediate body 50, thickness at the periphery of the packing shaft 48 and thickness of the outer circumferential side of the metal mold material 46 are not constant. In FIG. 20, R indicates radius of the metal mold intermediate body 50.

The photosensitive resist layer 52 is formed on the disc molding plane surface 46a of the molding metal mold intermediate body 50 by the spin coat method as described above. Since the photosensitive resist layer 52 is adapted so that since the photoresist is diffused from the central portion of the disc molding plane surface 46a toward the outer circumferential side thereof by the centrifugal force, the thickness of the outer circumferential side gradually becomes large with respect to thickness of the inner circumferential side as indicated by B in FIG. 21B. In more practical sense, there takes place difference of thickness of about 100 nm between the inner circumferential side and the outer circumferential side of the disc molding plane surface 46a.

Further, it is desirable to constitute a metal mold apparatus which can mold or form disc substrate in which degree of flatness of the surface exhibits high accuracy.

The metal mold unit provided with metal mold which can obtain degree of flatness of higher accuracy, can mold the disc substrate with high accuracy without deforming uneven pattern formed on the surface thereof, and can form recording tracks with circularity of high accuracy will be described below.

First and second metal molds constituting the cavity which constitutes the disc molding plane portion of this metal mold unit are adapted so that uneven patterns are directly formed at the disc molding plane surface side similarly to the metal mold of the above-described metal mold unit.

The process for manufacturing this metal mold 61 will now be described with reference to the process diagram of FIG. 22.

In order to form this metal mold 61, metal mold material 62 consisting of metal such as stainless steel, etc. serving as base material of the metal mold 61 is prepared. As shown in FIG. 22, at metal mold preparatory machining process of step 1 ($S_1$), the configuration necessary as the metal mold is formed by machining at this metal mold material 62. At this time, the disc molding plane surface 62a side of the metal mold material 62 is abrasion-processed with high accuracy so that it is flattened. Moreover, at the central portion of the metal mold material 62, there is bored, as shown in FIG. 23, a center hole 63 in which an attachment member 39 for attaching a sprue bush 38 or a punch 41 is disposed. As shown in FIG. 23, a packing shaft 64 is fitted into this center hole 63 in order to flatten the molding plane surface 62a side of the metal mold material 62. Fitting of this packing shaft 64 is carried out by shrinkage fitting to heat the metal mold material 62 to carry out fitting.

Figure 22:
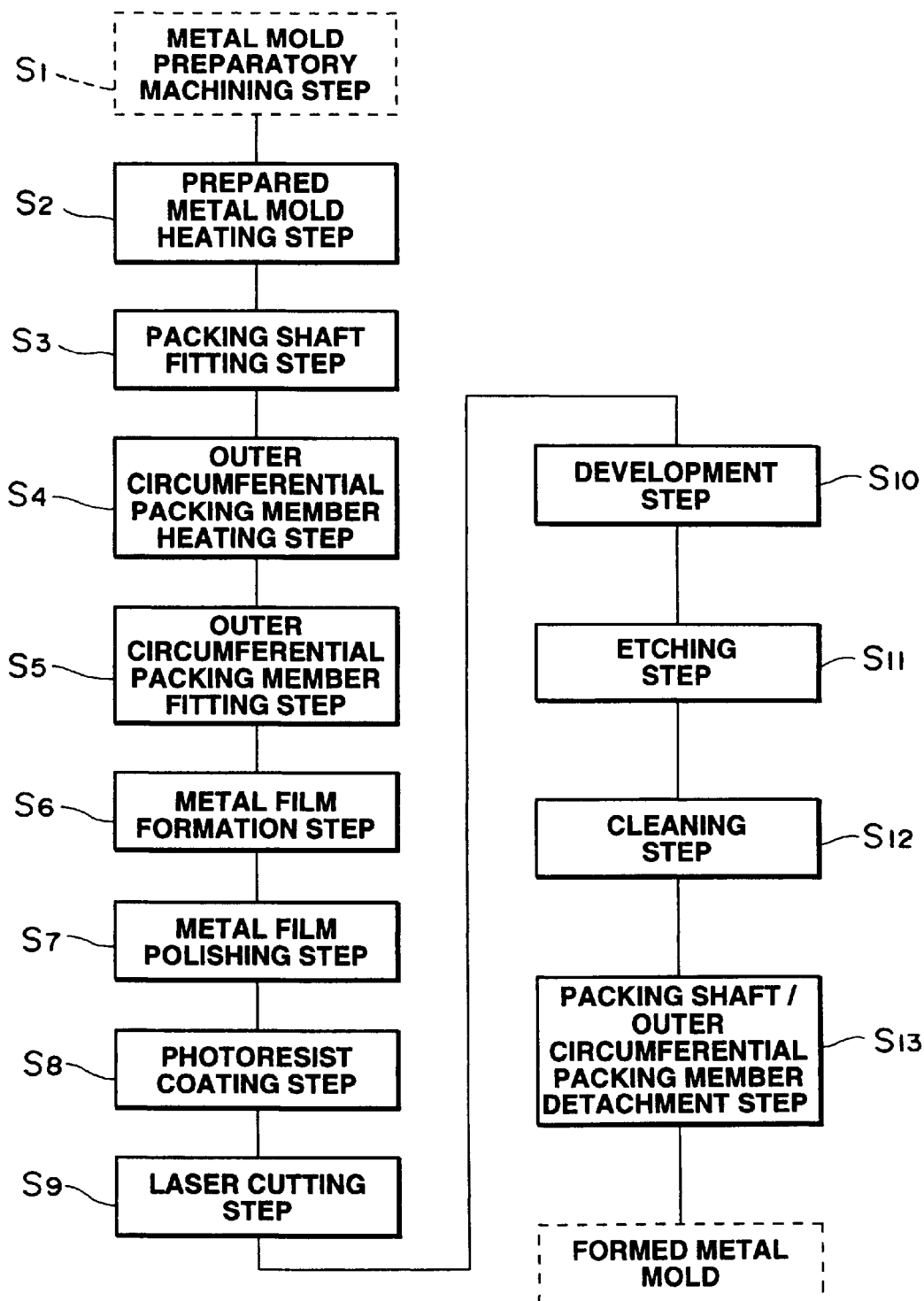
FIG. 22 is a process diagram showing process steps for molding metal mold in which uneven pattern is provided at metallic film formed on the disc molding plane surface.
Figure 23:
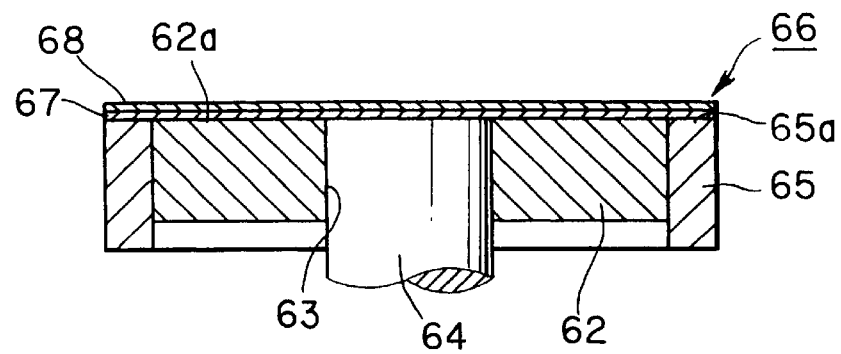
FIG. 23 is a cross sectional view of metal mold intermediate body for molding metal mold in which uneven pattern is provided.

In order to carry out fitting of this packing shaft 64, metal mold material 62 is heated at prepared metal mold heating process of step 2 ($S_2$) as shown in FIG. 22. As the result of the fact that the metal mold material 62 is heated, the diameter of the center hole 63 is enlarged. Then, at packing shaft fitting process of step 3 ($S_3$), the packing shaft 64 is fitted into the center hole 63 as shown in FIG. 23. At this time, since the metal mold 62 is heated so that the diameter of the center hole 63 is enlarged, it is possible to easily fit the packing shaft 64 having the same diameter as that of the center hole 63.

Then, as shown in FIG. 23, a ring-shaped outer circumferential packing member 65 is fitted with respect to the outer circumferential side of the metal mold material 62. Fitting of this outer circumferential packing member 65 is carried out by shrinkage fitting to heat the outer circumferential packing member 65 to carry out fitting thereof. Namely, the outer circumferential packing member 65 is heated at the outer circumferential packing member heating process of step 4 ($S_4$) shown in FIG. 22. Since the outer circumferential packing member 65 is heated so that the inside diameter is enlarged, it is possible to easily fit it with respect to the outer circumferential side of the metal mold material 62.

Further, the outer circumferential packing member 65 is fitted, at the outer circumferential packing member fitting process of step 5 ($S_5$) shown in FIG. 22, with respect to the outer circumferential side of the metal mold material 62 in such a manner that front end surface 65a constitutes the plane flush with the disc molding plane surface 62a. The outer circumferential packing member 65 is heated and is then cooled so that its diameter is reduced. The diameter reduced outer circumferential packing member 65 is tightly fitted with respect to the outer circumferential side of the metal mold material 62. Thus, slipping off thereof is prevented.

By fitting the packing shaft 64 into the center hole 63 of the metal mold material 62 to fit the outer circumferential packing member 65 with respect to the outer circumferential side in this way, a metal mold intermediate body 66 is constituted. In this metal mold intermediate body 66, the disc molding plane surface 62a side is flattened as the result of the fact that the center hole 63 is packed by the packing shaft 64, and its diameter is enlarged as the result of the fact that the outer circumferential packing member 65 is fitted with respect to the outer circumferential side.

Figure 24:
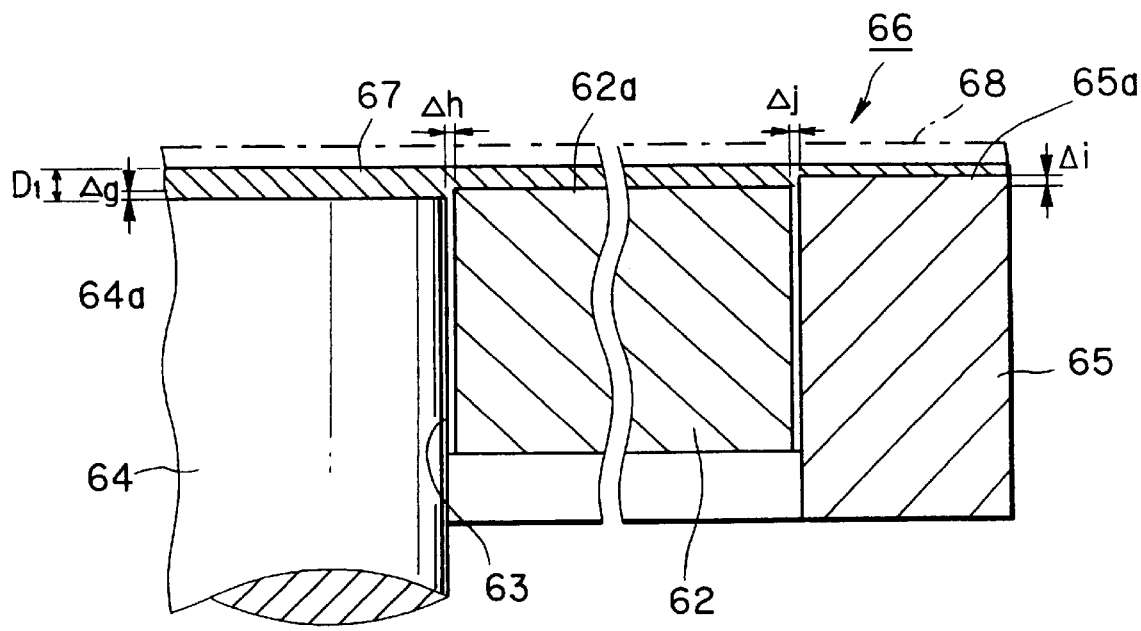
FIG. 24 is an essential part cross sectional view showing the state where metallic film is formed on disc molding plane surface of metal mold intermediate body.

Meanwhile, when the packing shaft 64 is caused to be fitted with respect to the metal mold material 62, offset Δg takes place between a front end surface 64a of the packing member 64 and the disc molding plane surface 62a. Moreover, gap Δh takes place between the outer circumferential surface of the packing member 64 and the inner circumferential surface of the center hole 63. Further, when the outer circumferential packing member 65 is fitted with respect to the metal mold material 62, offset Δi takes place between a front end surface 65a of the outer circumferential packing member 65 and the disc molding plane surface 62a as shown in FIG. 24. In addition, gap Δj takes place between the outer circumferential surface of the metal mold material 62 and the inner circumferential surface of the outer circumferential packing member 65.

When such offsets Δg, Δi and/or gaps Δh, Δj take place at the disc molding plane surface 62a, the photosensitive resist layer formed on the disc molding surface 62a of the molding metal mold intermediate body 62 cannot be formed so as to have uniform thickness. Thus, the uneven pattern cannot be formed with high accuracy.

In view of the above, at metallic film formation process of step 6 ($S_6$) shown in FIG. 22, such an approach is employed as shown in FIGS. 23 and 24 to correct offsets Δg, Δi and/or gaps Δh, Δj as described above to form a metallic film 67 so as to flatten the entire surface of inner and outer circumferential portions of the disc molding plane surface 62a of the molding metal mold intermediate body 62. This metallic film 67 is formed so as to have thickness $D_1$ of 5 μm to 10 μm. The metallic film 67 is formed by iridium or titanium, alloy of iridium, or alloy of titanium. In order to form this metallic film 67, it is formed by plating, sputtering or depositing iridium or titanium, alloy of iridium, or alloy of titanium.

The metallic film 67 formed on the disc molding plane surface 62a is polished at metallic layer polishing process step of step 7 ($S_7$) shown in FIG. 22 so that its surface is flattened with high accuracy. Namely, the metallic film 67 fills respective gaps Δh, Δj shown in FIG. 24 to correct respective offsets Δg, Δi to allow the disc molding plane surface 62a to be plane surface having no rising portion and flattened with extremely high accuracy, which is equivalent to the glass base. The metallic film 67 is polished so that the entire thickness becomes equal to 3 μm to 5 μm.

Figure 25:
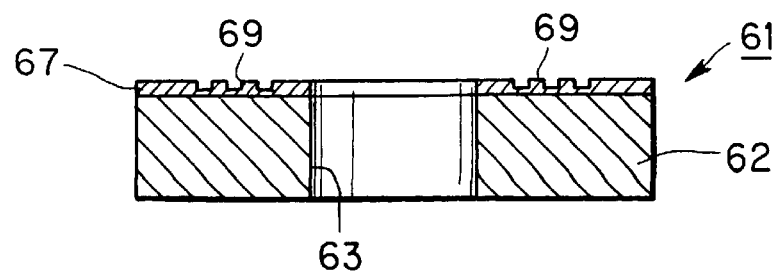
FIG. 25 is a cross sectional view showing metal mold in which uneven pattern is formed at metallic film.

Further, in the metal mold intermediate body 66, etching is implemented to the metallic layer 67 formed at the disc molding plane surface 62a side. Thus, there is constituted a metal mold 61 where there is formed uneven pattern 69 corresponding to uneven pattern corresponding to information signal or control signal formed at the disc substrate molded or formed at the disc molding plane surface 62 side as shown in FIG. 25.

The configuration for forming this uneven pattern 69 will now be described.

In order to form uneven pattern 69, a photoresist layer 68 is formed as shown in FIG. 23 at the photosensitive resist coating process of step 8 ($S_8$) shown in FIG. 22. This photosensitive resist layer 68 is formed by dropping photosensitive resist in liquid state at the central portion of the surface of the molding metal mold intermediate body 66 in the state where the molding metal mold intermediate body 66 is mounted on rotary table (not shown) and is rotated. Namely, the photosensitive resist dropped on the surface of the rotated molding metal mold intermediate body 66 is diffused toward the outer circumferential side along the molding plane surface 62a of the molding metal mold intermediate body 66 by the centrifugal force. Since the photosensitive resist is adapted so that since, as described above, the disc molding plane surface 62a of the molding metal mold intermediate body 66 is flattened by the packing shaft 64 and its diameter is enlarged by the outer circumferential packing member 65, it is diffused in uniform state over the entire surface of this molding plane surface 62a to constitute photosensitive resist layer 68. The photosensitive resist layer 68 is formed so as to have substantially uniform thickness without forming rising portion at the periphery of the center hole 63 or the outer circumferential side forming the outer circumferential side of the data recording area.

Figure 21:
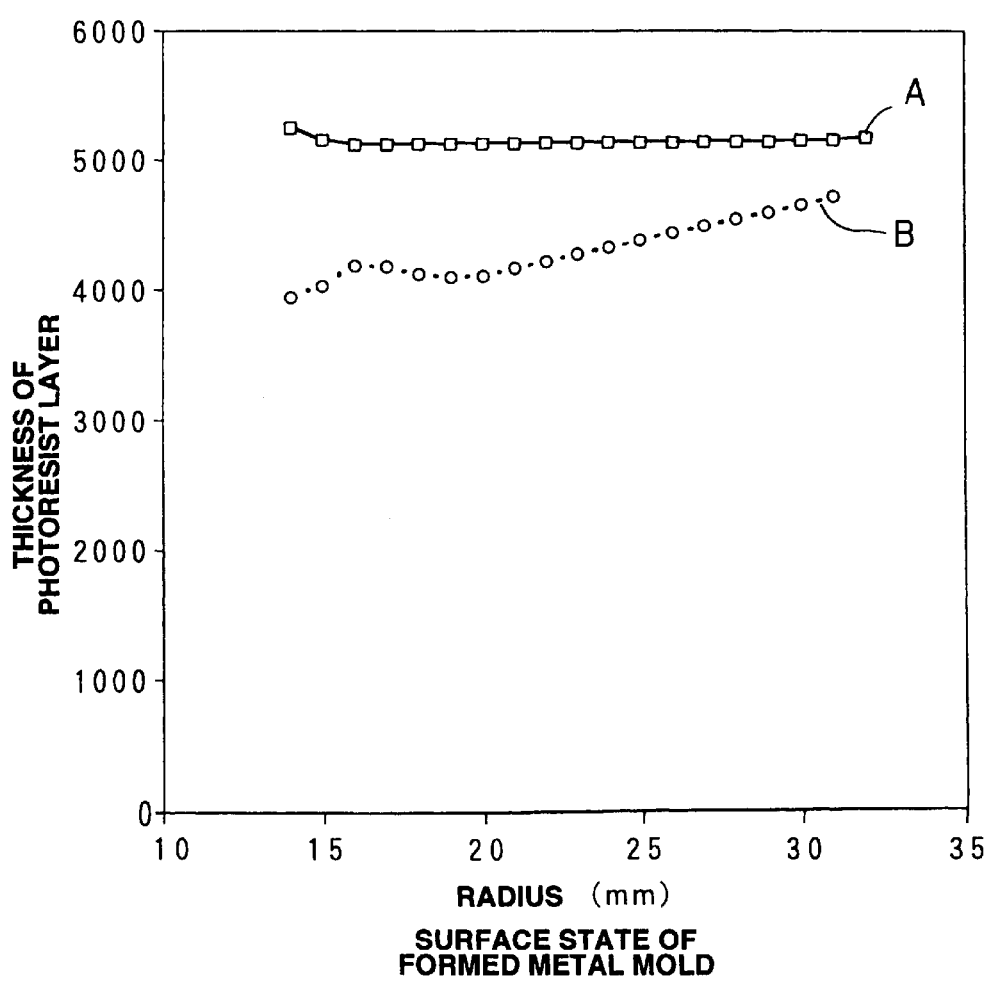
FIG. 21 is a view for explaining the state of photosensitive Regis layer formed on the disc molding surface of the metal mold intermediate body.

The photosensitive resist layer 68 formed in this example is formed so as to have thickness of 5 nm or less in the area ranging from 15 mm to 32 mm as indicated by A in FIG. 21.

The photosensitive resist layer 68 formed on the disc molding plane surface 62a of the molding metal mold intermediate body 66 is exposed to light at the laser cutting process of step 9 ($S_9$) shown in FIG. 22. Thus, latent image of the uneven pattern is formed. This laser cutting process step is the process step for carrying out irradiation of laser beams in correspondence with uneven pattern constituting the signal recording portion where various information signals are recorded, which are formed on the magnetic disc constituted by using the disc substrate to be molded or formed here to allow the photosensitive resist layer to be exposed to light to form latent image of the uneven pattern. This latent image of the uneven pattern is actualized as the result of the fact that the photosensitive resist layer 68 is subjected to development processing at the development process of the subsequent step 10 ($S_{10}$) to form uneven pattern at the photosensitive resist layer 68 formed at the disc molding plane surface 62a of the molding metal mold intermediate body 66.

To the molding metal mold intermediate body 66 in which laser beams are irradiated to the photosensitive resist layer 68 so that latent image of the uneven pattern has been implemented, etching is implemented at the etching process of step 11 ($S_{11}$) shown in FIG. 22. Namely, etching processing is implemented to the metallic layer 67 formed on the disc molding plane surface 62a of the molding metal mold intermediate body 66 in which the photosensitive resist layer 68 to which latent image of the uneven pattern has been implemented is formed. At the metallic film 67 from which the photosensitive resist layer 68 has been removed by this etching processing, precise uneven pattern is directly engraved. Then, at the cleaning process of step 12 ($S_{12}$) shown in FIG. 22, the photosensitive resist layer 68 left on the metallic film 67 of the molding metal mold intermediate body 66 is removed.

In the molding metal mold intermediate body 66, precise uneven pattern 69 is formed at the metallic film 67 formed on the disc molding plane surface 62a by the above-described process step, and the packing shaft 64 and the outer circumferential packing member are detached from the metal mold material at the packing shaft 64/the outer circumferential packing member detachment process of step 13 ($S_{13}$) shown in FIG. 22. Thus, metal mold 61 as shown in FIG. 25 is obtained. In the metal mold 61 obtained here, as shown in FIG. 25, there is formed precise uneven pattern 69 directly engraved in a manner ranging from the outer circumference of its center hole 63 toward the portion in the vicinity of the outer circumferential side. This metal mold 61 is assembled with respect to metal mold attachment plate so that the metal mold apparatus is constituted. The metal mold apparatus thus constituted is attached to disc substrate molder.

In the metal mold 61 constituted as described above, the metallic film 67 integrally formed at the disc molding plane surface 62a fills up very small holes and/or uneven portions taking place at the disc molding plane surface 62a, thus to flatten the disc molding plane surface with high accuracy. Moreover, since the metallic film 67 can be also formed in the flattened state with high accuracy without allowing very small holes and/or uneven portions to take place, uneven pattern 69 formed at the metallic film 67 is formed with high accuracy without allowing distortion and/or very small projection, etc. to take place. Accordingly, this metal mold 61 is used, thereby making it possible to carry out forming or molding of disc substrate with higher accuracy.

As described above, also in the metal mold unit provided with the metal molds for molding disc substrate where uneven pattern corresponding to information signal or control signal is formed on the surface, temperature control mechanism is provided in a manner similar to the previously described metal mold unit provided with metal molds only comprising the smoothing layer. Thus, molding of the disc substrate is carried out in the state where temperature control of the metal molds has been carried out.

The example where temperature control mechanism 71 is provided at the previously described metal mold unit 31 using the first and second metal molds 34, 35 in which uneven pattern is directly formed at the disc molding plane surface of the metal mold will be described.

Figure 26:
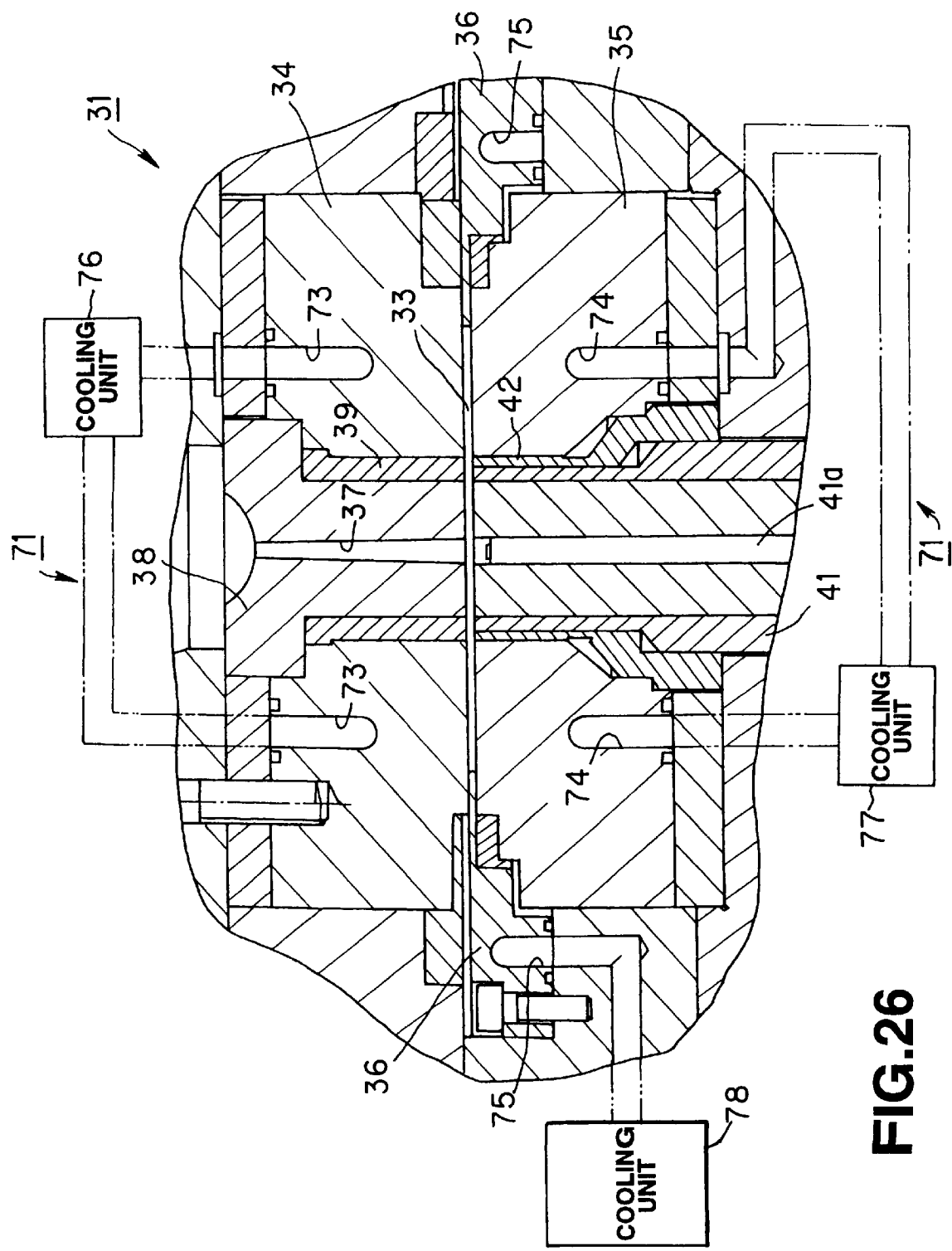
FIG. 26 is a cross sectional view of metal mold apparatus adapted so that metal molds in which uneven pattern is formed at disc molding plane surface are assembled therewithin and temperature adjustment mechanism is provided.

The temperature control mechanism 71 provided at this metal mold unit 31 is composed, as shown in FIG. 26, of cooling circulation paths 73, 74, 75 formed by boring the first and second metal molds 34, 35 and the outer circumferential side metal mold 36 and through which cooling liquids such as cooling water or cooling oil, etc. are circulated, and cooling units 76, 77, 78 for adjusting temperatures of the cooling liquids circulated through these cooling circulation paths 73, 74, 75. The cooling units 76, 77, 78 respectively comprise temperature adjustment mechanisms (not shown) for adjusting temperatures of respective cooling liquids, and serve to independently circulate the respective cooling liquids circulated through the first and second metal molds 34, 35 and the outer circumferential side metal mold 36 so as to take predetermined temperatures by these temperature adjustment mechanisms. In addition, these cooling units 76, 77, 78 respectively independently control temperatures of the first and second metal molds 34, 35 and the outer circumferential side metal mold 36 through respective cooling liquids so that their temperatures are equal to (Tg–24)° C. or more.

In this case, Tg indicates glass transition temperature of synthetic resin material filled into metal mold unit 31. Since glass transition temperature Tg of this synthetic resin is 138° C., e.g., in the case where amorphous polyolefine is used as material constituting the disc substrate 32, temperatures of the first and second metal molds 34, 35 and the outer circumferential side metal mold 36 are controlled so that they are equal to 114° C. Namely, the first and second metal molds 34, 35 and the outer circumferential side metal mold 36 are respectively controlled so that their temperatures are equal to 114° C. or more when the injected and filled synthetic resin material is cooled and solidified.

As long as the temperature control mechanism 71 can control the periphery of the cavity 33 so that its temperature is equal to (Tg–24)° C. or more, it may be provided at each of the first and second metal molds 34, 35 or only either one of the first metal molds 34, 35.

In this example, in the metal mold unit 31 shown in FIG. 26, a thrust pin 41a for removing punch refuse punched by the punch 41 is disposed at the central portion of the punch 41 so that it can be advanced and withdrawn.

In order to mold or form the disc substrate 32 by the metal mold unit 31 constituted as described above, synthetic resin material in molten state is filled into the cavity 33 through the nozzle 37 of the sprue bush 38 in the mold clamped state where the first and second metal molds 34, 35 are butted to each other. The punch 41 is protruded into the cavity 33 in the state where the synthetic resin filled within the cavity 33 is semi-hardened to form center hole at the disc substrate 32 to be molded or formed. Thereafter, in the metal mold unit 31, the second metal mold 35 constituting the movable side is caused to undergo an operation such that it is spaced relative to the first metal mold 34 to carry out mold opening operation. Thus, molding of the disc substrate 32 is carried out. Magnetic film or protective film is formed on the surface of the disc substrate 32. Thus, magnetic disc as information signal recording medium is constituted.

Disc substrate molded by using the metal mold unit 31 provided with the temperature control mechanism 71 and adapted so that molding temperature of the disc substrate 32 is controlled will now be described in more practical sense with reference to FIGS. 27, 28 and 29.

Figure 27:
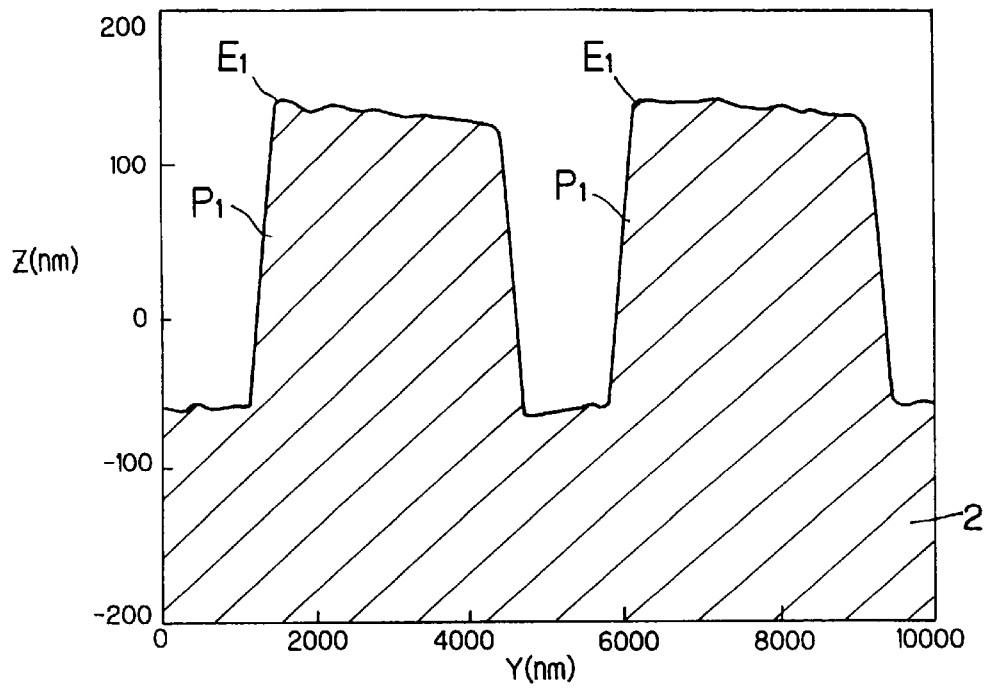
FIG. 27 is a view showing shape of uneven pattern of disc substrate molded under the state where the metal mold is controlled so that its temperature is equal to (Tg−24)° C.
Figure 28:
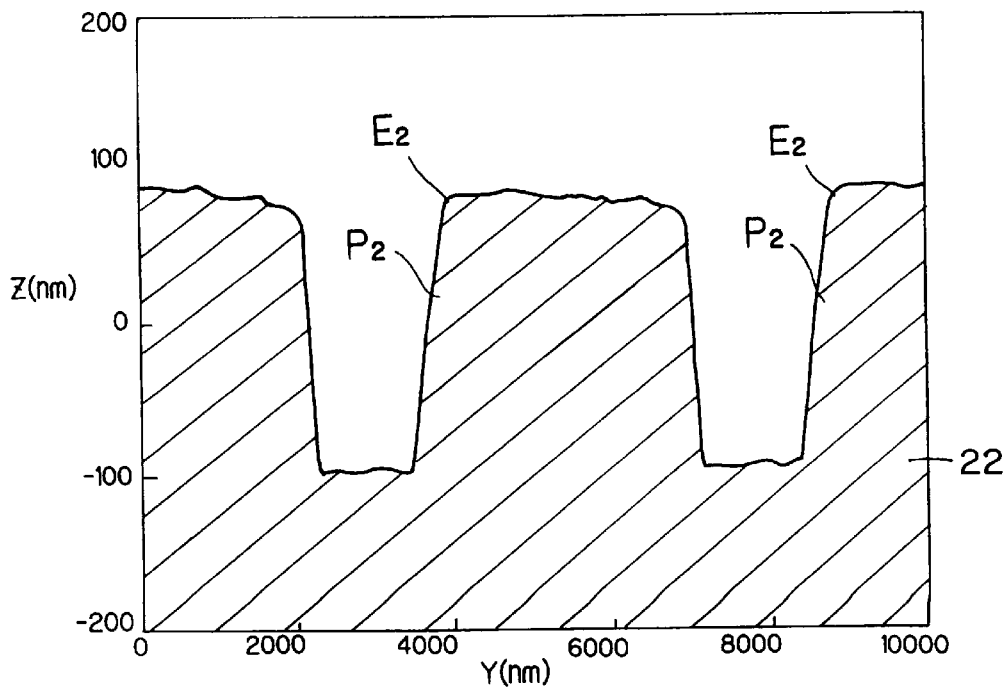
FIG. 28 is a view showing shape of uneven pattern of disc substrate molded under the state where the metal mold is controlled so that its temperature is equal to (Tg−10)° C.
Figure 29:
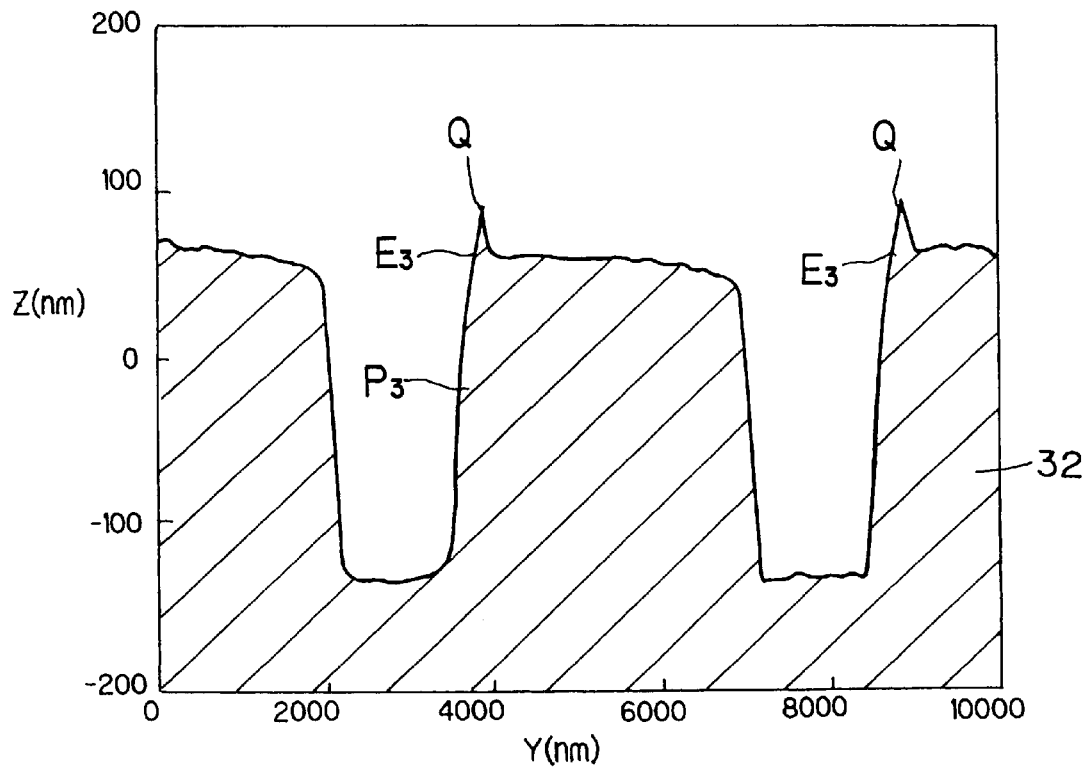
FIG. 29 is a view showing shape of uneven pattern of disc substrate molded under the state where the metal mold is controlled so that its temperature is equal to (Tg−28)° C.

In FIGS. 27, 28, 29, the left side indicates the outer circumferential side of disc substrate to be molded or formed, and the left side indicates the inner circumferential side of the disc substrate.

Moreover, in FIGS. 27, 28 and 29, the ordinate indicates position in the thickness (Z) direction of the disc substrate molded by this metal mold unit 31, and the abscissae indicates the position in the radial (Y) direction of the disc substrate. Further, in FIGS. 27, 28 and 29, the slanting line implemented area indicates longitudinal cross section of respective uneven patterns formed on the molded or formed disc substrate.

FIG. 27 shows disc substrate 32 molded in the state controlled so that temperatures of the first and second metal molds 34, 35 and the outer circumferential metal mold 36 are equal to 114° C. which is (Tg–24)° C. when synthetic resin material filled within the cavity 33 is cooled and solidified. In the case of this disc substrate 32, breakage taking place at the edge portion $E_1$ of uneven pattern $P_1$ formed on the disc substrate 32 when the disc substrate 32 is peeled off or separated from the first and second metal molds 34, 35 is extremely small. Namely, on the disc substrate 32, there are formed uneven patterns having satisfactory edge shape by uneven patterns 44, 45 formed at the first and second metal molds 34, 35.

FIG. 28 shows disc substrate 32 molded so that temperatures of the first and second metal molds 34, 35 and the outer circumferential side metal mold 36 become equal to 124° C. which is (Tg–10)° C. when synthetic resin material filled within the cavity 33 is cooled and solidified. In the case of this disc substrate 32, breakage taking place at the edge portion $E_2$ of the uneven pattern $P_2$ formed on the surface of the disc substrate 32 when the disc substrate 32 is peeled off or separated from the first and second metal molds 34, 35 is extremely small. Namely, on the disc substrate 32, there are formed uneven patterns having satisfactory edge shape by uneven patterns 44, 45 formed on the first and second metal molds 34, 35.

FIG. 29 shows disc substrate 32 molded so that temperatures of the first and second metal molds 34, 35 and the outer circumferential metal mold 36 become equal to 110° C. which is (Tg–28)° C. when synthetic resin material filled within the cavity 33 is cooled and solidified. In the case of this disc substrate 32, when the disc substrate 32 is peeled off or separated from the first and second metal molds 34, 35, uneven pattern $P_3$ formed on the surface thereof is damaged, so projection Q in acute angle form takes place at the edge portion $E_3$ thereof.

Meanwhile, since uneven patterns 44, 45 are directly formed in the first and second metal molds 34, 35 used here, it is unnecessary to take into consideration the previously described influence by thermal contraction of the stamper, but it is sufficient to take into consideration only synthetic resin material to be cooled and solidified and thermal contraction of the first and second metal molds 34, 35 and the outer circumferential side metal mold 36.

The disc substrate 32 molded by using the above-described metal mold unit 31 is such that the first and second metal molds 34, 35 and the outer circumferential side metal mold 36 are controlled so that their temperatures become equal to a predetermined value of (Tg–24)° C. or more, whereby it is suppressed that edge shape of uneven pattern formed at the disc substrate 32 is damaged. Accordingly, this metal mold unit 31 is used, thereby making it possible to carry out molding of disc substrate 32 in which uneven patterns 44, 45 formed on the first and second metal molds 34, 35 have been transferred with high accuracy.

Meanwhile, the magnetic disc constituted by using the disc substrate 32 molded or formed by the above-described metal mold unit 31 is adapted so that in the case where height when the head slider to which the magnetic head for carrying out recording/reproduction of information signals is attached floats from the disc surface at the time of recording/reproduction is, e.g., 50 nm, allowed values of floating height change quantities with respect to respective items as indicated below are set.

Namely, 20 nm is set with respect to the projection of the disc surface, 10 nm is set with respect to waviness of the disc surface, 5 nm is set with respect to floating quantity change of the head slider by uneven pattern, 8 nm is set with respect to warp of the disc substrate 32, and 7 nm is set with respect to influence by disturbance.

In the case of the disc substrate 32 molded or formed by the above-described metal mold unit 31, glide height which is height from the disc average plane surface of local waviness or projection-shaped waviness by projection taking place on the disc surface can be held down to 80% or less of the flight height which is the floating height of the head slider with respect to the disc average plane surface.

In this case, with respect to the disc substrate constituting the magnetic disc included within the disc drive unit, when realization of high recording density, etc. of information signals is taken into consideration, it is desirable that the glide height is set to 60% or less of the flight height.

Figure 30:
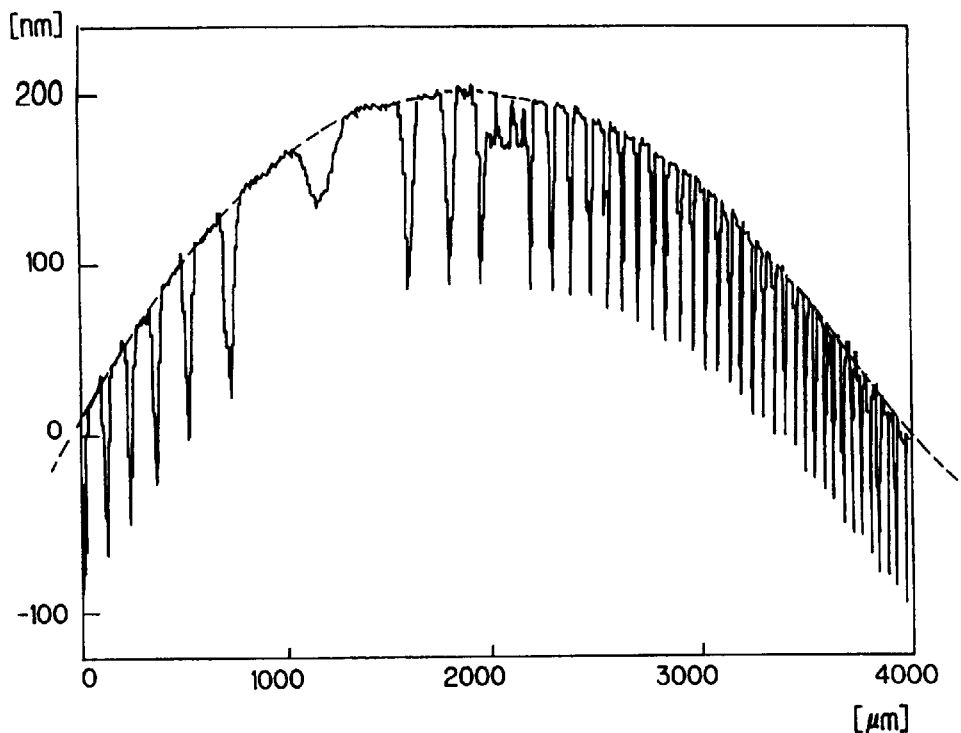
FIG. 30 is a view showing surface state of disc substrate molded by the metal mold apparatus shown in FIG. 26.

The surface state of the disc substrate 32 molded or formed by using the above-described metal mold unit 31 shown in FIG. 26 will now be described with reference to FIG. 30. In FIG. 30, the ordinate indicates amplitude of the projection-shaped waviness taking place at the surface of the disc substrate 32, and the abscissa indicates distance in the radial direction of the disc substrate 32. In addition, broken lines shown in FIG. 30 indicate warp taking place at the entirety of the disc substrate 32.

On the surface of this disc substrate 32, as shown in FIG. 30, local waviness or projection-shaped waviness by projection does not take place within the range of 4000 μm in the tangential direction of recording tracks formed in a concentrical form at an arbitrary position in the radial direction. Accordingly, it is prevented that when the head slider having width caused to be 2 mm scans on this disc substrate 32 with floating quantity of 50 nm, it comes into contact with the surface of the disc substrate 32.

Figure 1:
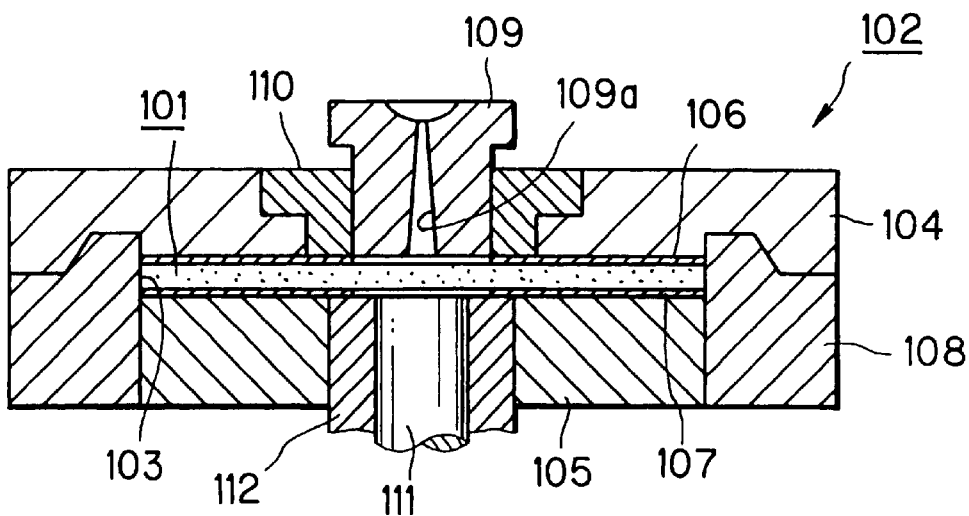
FIG. 1 is an essential part cross sectional view showing a disc substrate molding metal mold apparatus which is prior to this invention.
Figure 2:
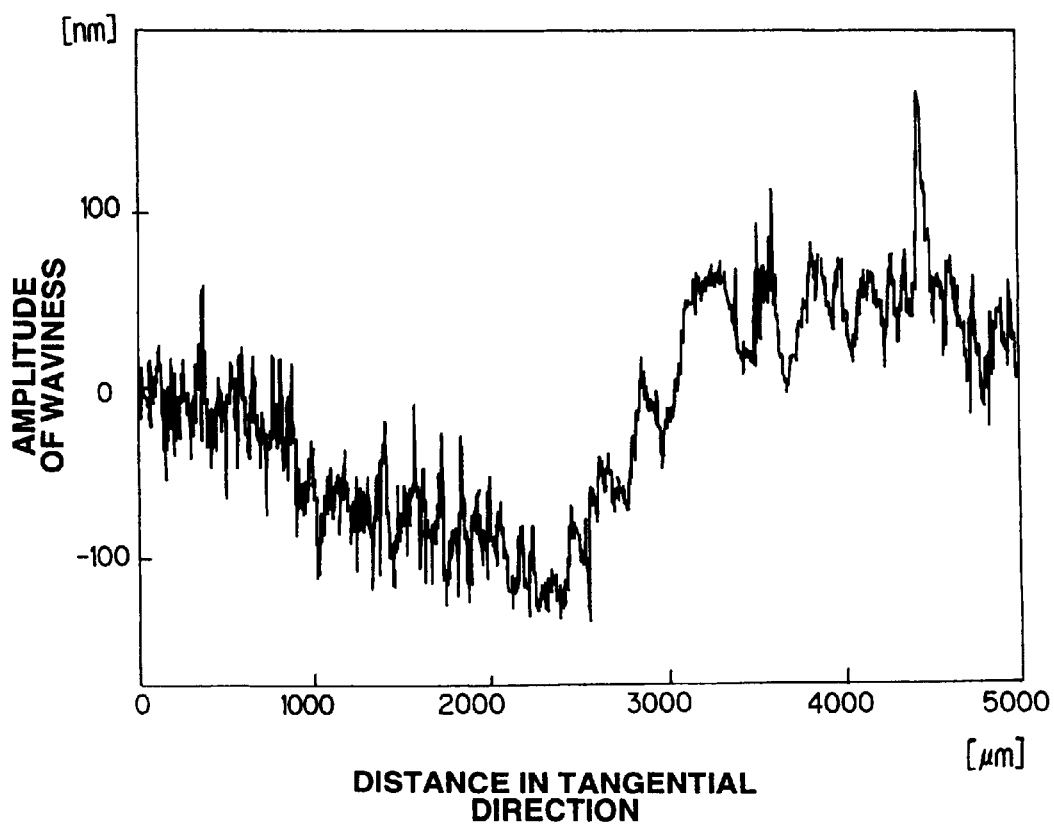
FIG. 2 is a view for explaining the state of waviness taking place in stamper affixed with respect to the metal mold apparatus.
Figure 3:
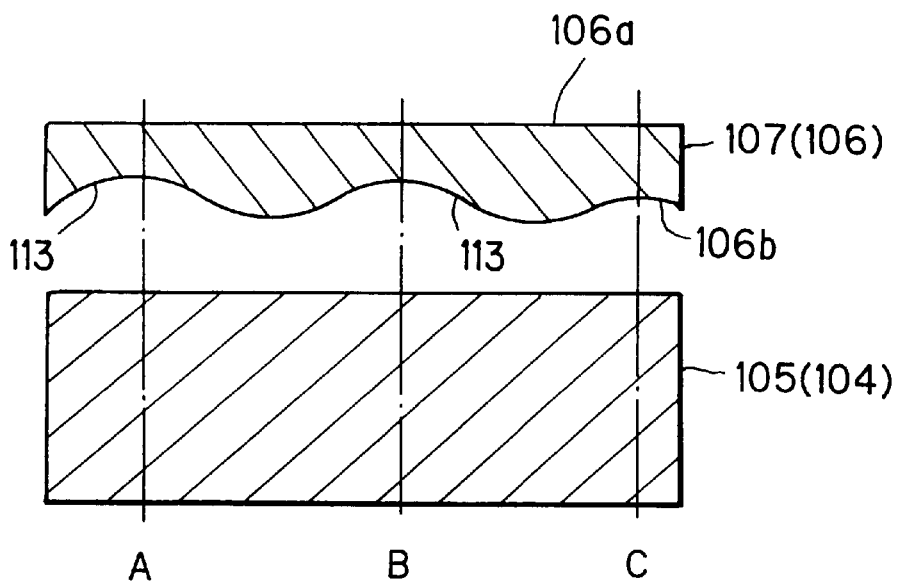
FIG. 3 is a cross sectional view showing the relationship between stamper where waviness takes place on the back face and metal mold to which this stamper is affixed.
Figure 4:
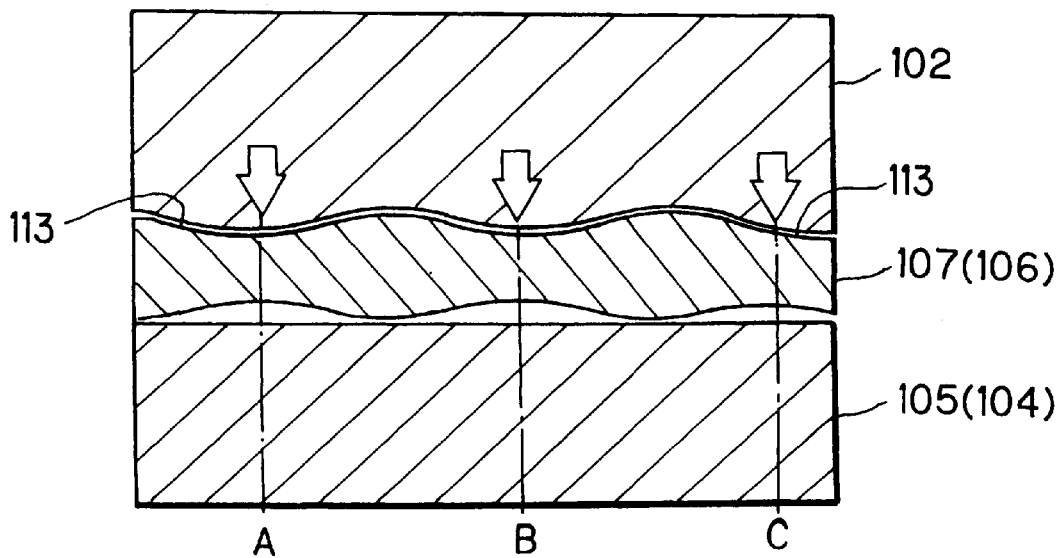
FIG. 4 is a cross sectional view for explaining the state where disc substrate is molded by using metal mold apparatus to which stamper where waviness takes place on the back face is affixed.
Figure 5:
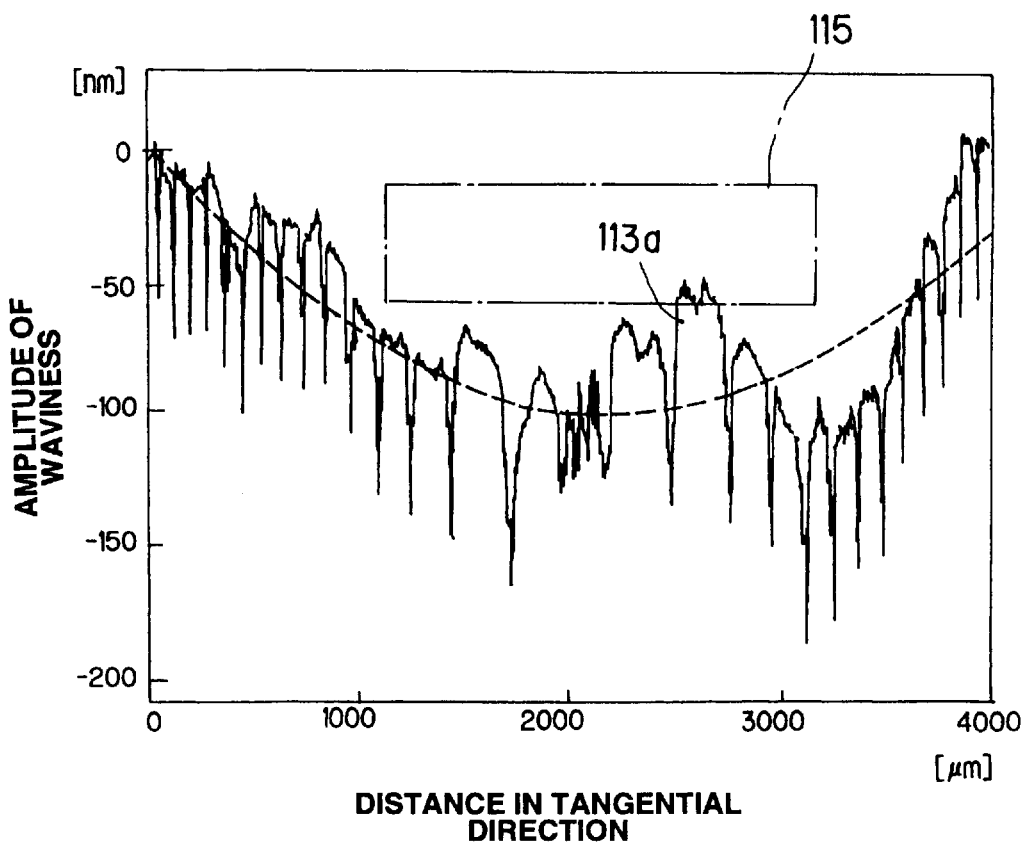
FIG. 5 is a view for explaining the state of surface of disc substrate molded by the metal mold apparatus shown in FIG. 4.
Figure 6:
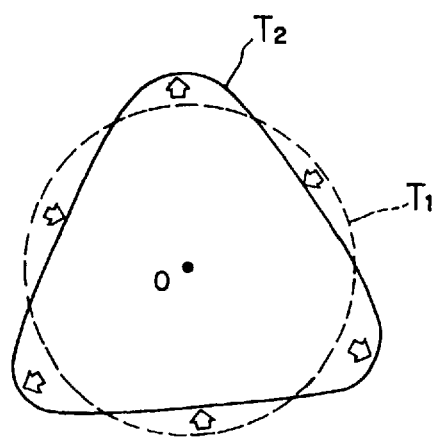
FIG. 6 is view for explaining the state where recording track formed at stamper affixed to the metal mold apparatus is strained or deformed.
Figure 7:
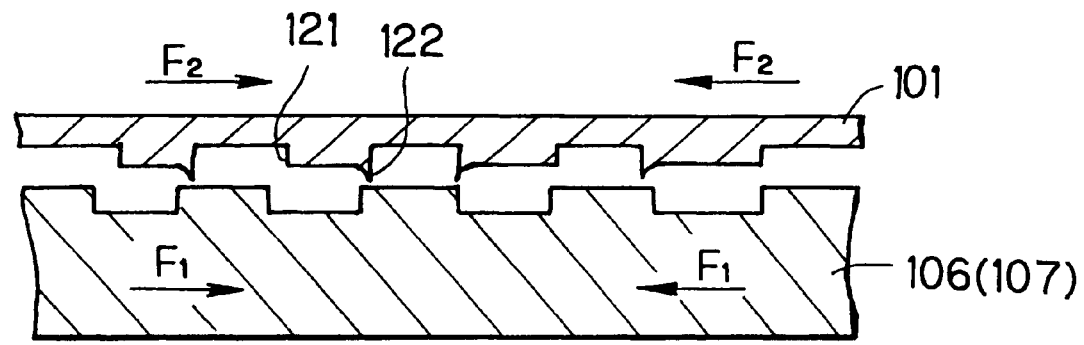
FIG. 7 is a cross sectional view showing the state of thermal contraction of stamper and disc substrate molded by this stamper.
Figure 8:
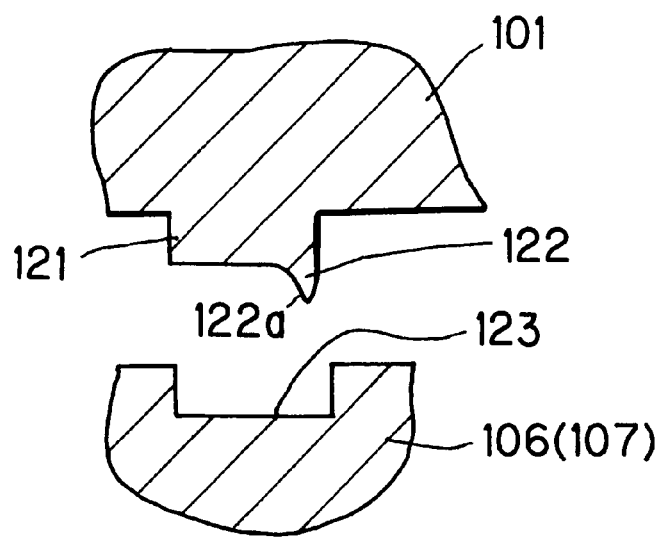
FIG. 8 is a cross sectional view showing the state where very small projection is formed at uneven pattern formed at the disc substrate by the uneven pattern formed at the stamper.
Figure 31:
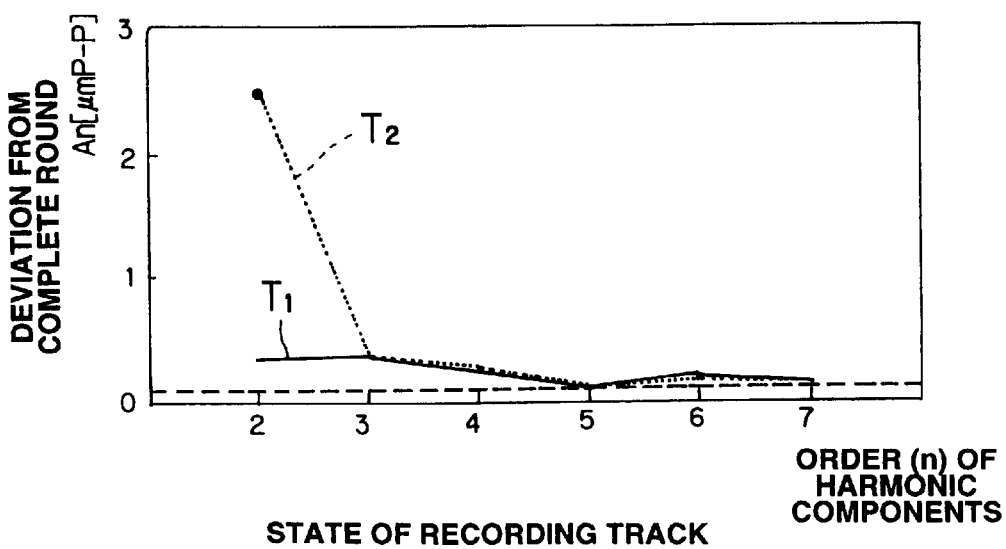
FIG. 31 is a view showing the state of recording tracks formed on the disc substrate.

Moreover, recording tracks constituted by uneven patterns transferred to the disc substrate 32 will be described with reference to FIG. 31. In FIG. 31, the ordinate indicates deviation quantity from complete round of recording tracks, and the abscissa indicates order of harmonic components of deviation from the complete round. In addition, solid line $T_1$ in FIG. 31 indicates disc substrate 32 molded or formed by using the above-described metal mold unit 31 according to this invention, and broken lines $T_2$ in FIG. 31 indicate disc substrate 101 molded or formed by the previously described metal mold unit 102 shown in FIG. 1 which is prior to this invention.

In the disc substrate 32 molded or formed by using the metal mold unit 31 according to this invention, harmonic secondary component which is elliptical component is greatly reduced. Namely, in the case of the disc substrate 32 molded or formed by using the metal mold unit 31 according to this invention, the harmonic secondary component is reduced to about ⅕ as compared to the disc substrate 101 molded by the metal mold unit 102 shown in FIG. 1.

The metal mold unit 31 according to this invention permits height of projection-shaped waviness taking place at the disc substrate 32 to be held down to less than 10 nm, and harmonic wave secondary component of deviation from the complete round of recording tracks can be held down to less than 1.0 μm. In the disc substrate 32 molded or formed by this metal mold unit 32, glide height of projection-shaped waviness taking place within the projected area where the head slider is projected onto the disc surface is caused to be lower than flight height of the head slider. As a result, it can be securely prevented that the head slider comes into contacts with the disc surface. Thus, operation reliability of recording and/or reproduction of information signals can be sufficiently ensured.

It is to be noted that the metal mold apparatus for molding disc substrate according to this invention can be used for forming or molding not only the disc substrate constituting magnetic disc, but also disc substrate for the discs used as the recording medium for information signals such as optical disc or magneto-optical disc, etc.

Industrial Applicability

Since the metal mold apparatus according to this invention is adapted so that smoothing layers of metal are integrally formed at the molding plane surface side of the first metal mold serving as the fixed side and the second metal mold serving as the movable side which are adapted so that they are butted to each other to constitute molding portion for forming or molding disc substrate, it is possible to mold or form disc substrate of which surface has been flattened with high accuracy.

In addition, at the molding plane surface side of the first metal mold serving as the fixed side and the second metal mold serving as the movable side, uneven pattern including at lest one kind of uneven pattern corresponding to information signals, uneven pattern corresponding to control signal, and uneven pattern indicating recording tracks formed on disc substrate to be molded or formed is directly formed. Thus, it is possible to mold or form disc substrate to which uneven pattern of the metal mold side has been transferred with high accuracy without allowing local waviness undulation or projection occurring on the disc surface to take place.

We claim:

1. A disc substrate molding metal mold apparatus adapted for molding synthetic resin material to carry out molding of a disc substrate of an information signal recording medium, the metal mold apparatus comprising a first metal mold serving as the fixed side and a second metal mold serving as the movable side which are adapted so that they are butted to each other to constitute a molding portion for carry out molding of the disc substrate, temperature controlling means for controlling the temperature of the first metal mold and the second metal mold, said temperature controlling means controlling a temperature of the metal molds to a level not lower than (Tg−24)° C. when the synthetic resin material is cooled and solidified, wherein a smoothing layer of metal is integrally formed at the molding plane surface side of at least one of the first and second metal molds and wherein Tg is the glass transition temperature of the synthetic resin material.

2. A disc substrate molding metal mold apparatus as set forth in claim 1, wherein the smoothing layer is formed by plating, sputtering or depositing metallic material on the molding plane surface of at least one of the first and second metal molds.

3. A disc substrate molding metal mold apparatus as set forth in claim 1, wherein the smoothing layer is formed by metal including at least one kind selected from iridium and titanium.

4. A disc substrate molding metal mold apparatus as set forth in claim 1, wherein the smoothing layer has thickness of 1 $\mu$m to 15 $\mu$m.

5. A disc substrate molding metal mold apparatus as set forth in claim 1, wherein the smoothing layer is such that its surface is caused to undergo polishing or abrasion processing.

6. A method of manufacturing a disc substrate molding metal mold apparatus for molding disc substrates with synthetic resin material, the method comprising a first metal mold serving as the fixed side and a second metal mold serving as the movable side which are adapted so that they are butted to each other to constitute a molding portion for carrying out molding of disc substrate, and such that a smoothing layer of metal is integrally formed at the molding plane surface side of at least one of the first and second metal molds, the method comprising:

a packing member fitting step of fitting, with respect to at least one metal mold, a packing shaft into a central hole thereof in such a manner that the front end portion thereof constitutes plane substantially flush with the molding plane surface;

a step of forming metallic film by plating, sputtering or depositing metallic material on the molding plane surface surrounded by the outer circumferential packing member;

a photosensitive resist coating step of coating photosensitive resist on the metallic film to form a photosensitive resist layer;

a cutting step of irradiating light beams onto the photosensitive resist layer to allow a portion of the photosensitive resist layer to be exposed to light to form latent image pattern;

a development step of developing the photosensitive resist layer to form patter in which the latent image pattern is actualized on the molding plane surface;

an etching step of implementing etching processing to the metal mold to thereby remove unnecessary portion of the metallic film;

a cleaning step of removing the photosensitive resist layer from the molding plane surface;

a metallic film polishing step of polishing or abrasion-processing the surface of the metallic film to smooth it;

a packing member detachment step of detaching the packing shaft and the outer circumferential packing member from the metal mold; and a step of connecting a temperature control mechanism to at least one of the first and second metal molds for maintaining a temperature of the first and second molds to a level not lower than (Tg–24)° C. when the synthetic resin is cooled and solidified and wherein Tg is the glass transition temperature of the synthetic resin material.

7. A method of manufacturing a disc substrate molding metal mold apparatus as set forth in claim 6, wherein the fitting step of the packing shaft is carried out by fitting the packing shaft into a center hole thereof in the state where the metal mold is heated, and clearance is set to 2 $\mu$m or less.

8. A method of manufacturing a disc substrate molding metal mold apparatus as set forth in claim 6, wherein the fitting step of the outer circumferential packing member is carried out by fitting the outer circumferential packing member with respect to the outer circumferential portion of the first metal mold in the heated state, and clearance is set to 2 $\mu$m or less.

9. A method of manufacturing a disc substrate molding metal mold apparatus as set forth in claim 6, wherein the metallic film formed on the molding plane surface by the metallic film formation step has film thickness caused to be 5 $\mu$m or more, and is subjected to polishing or abrasion processing by the metallic film polishing step so that its film thickness becomes equal to 1 $\mu$m or more.

10. A disc substrate molding metal mold apparatus adapted for molding synthetic resin material to carry out molding of a disc substrate of an information signal recording medium, the metal mold apparatus comprising a first metal mold serving as the fixed side and a second metal mold serving as the movable side which are adapted so that they are butted to each other to constitute a molding portion for carrying out molding of the disc substrate, temperature controlling means for controlling the temperature of the first metal mold and the second metal mold, said temperature controlling means controlling a temperature of the metal molds to a level not lower than (Tg–24)° C. when the synthetic resin material is cooled and solidified, wherein a pattern area for carrying out molding of uneven pattern formed on the disc substrate to be molded or formed is formed at the molding plane surface side of at least one of the first and second metal molds and wherein Tg is the glass transition temperature of the synthetic resin material.

11. A metal mold apparatus for carrying out molding of disc substrate as set forth in claim 10, wherein uneven pattern including at least one kind of uneven pattern corresponding to information signal, uneven pattern corresponding to control signal, and uneven pattern indicating recording track formed on the disc substrate is formed in the pattern area.

12. A metal mold apparatus for carrying out molding of disc substrate as set forth in claim 10, wherein the uneven pattern formed in the pattern area is formed by etching.

13. A metal mold apparatus for carrying out molding of disc substrate as set forth in claim 10, wherein the uneven pattern formed in the pattern area is formed at a metallic layer formed on the molding plane surface of at least one of the first and second metal molds.

14. A metal mold apparatus for carrying out molding of disc substrate as set forth in claim 13, wherein the metallic layer where the uneven pattern is formed is formed by plating, sputtering or depositing metallic material on the molding plane surface of at least one of the first and second metal molds.

15. A metal mold apparatus for carrying out molding of disc substrate as set forth in claim 13, wherein the metallic layer is formed by metal including at least one kind selected from iridium and titanium.

16. A metal mold apparatus for carrying out molding of disc substrate as set forth in claim 13, wherein the metallic layer has thickness of 1 $\mu$m to 15 $\mu$m.

17. A metal mold apparatus for carrying out molding of disc substrate as set forth in claim 13, wherein the metallic layer is such that its surface is subjected to polishing or abrasion processing.

18. A disc substrate molding metal mold apparatus adapted for molding synthetic resin material to carry out molding of a disc substrate of an information signal recording medium, the metal mold apparatus comprising:
a first metal mold serving as the fixed side and a second metal mold serving as the movable side which are adapted so that they are butted to each other to constitute a molding portion for carrying out molding of the disc substrate; and
temperature control means for controlling temperature of at least one of the first and second metal molds,
wherein the temperature control means is adapted so that when the synthetic resin material is cooled and solidified, it controls temperature of the metal mold so as to take $(Tg-24)°$ C. or more wherein Tg is glass transition temperature of resin material.

19. A metal mold apparatus for carrying out molding of disc substrate as set forth in claim 18,
wherein the temperature control means is composed of a cooling circulation path through which cooling liquid is circulated, which is formed at least one of the first and second metal molds, and a cooling unit for cooling the cooling liquid circulated through the cooling circulation path.

20. A metal mold apparatus for carrying out molding of disc substrate as set forth in claim 18,
wherein a pattern area for carrying out forming of uneven pattern formed at the disc substrate to be molded or formed is formed at the molding plane surface side of at least one of the first and second metal molds.

21. A method of manufacturing a disc substrate molding metal mold apparatus for molding disc substrates with synthetic resin material, the method comprising a first metal mold serving as the fixed side and a second metal mold serving as the movable side which are adapted so that they are butted to each other to constitute a molding portion for carrying out molding of a disc substrate, and such that a pattern area for carrying out forming of uneven pattern formed at the disc substrate to be molded or formed is formed at the molding plane surface side of at least one of the first and second metal molds, the method comprising:
a packing member fitting step of fitting, with respect to at least one metal mold in which the pattern area is formed, a packing shaft into a center hole thereof in such a manner that the front end portion thereof constitutes plane substantially flush with the molding plane surface, and of fitting an outer circumferential packing member with respect to the outer circumferential portion thereof in such a manner that the front end surface thereof constitutes plane substantially flush with the molding plane surface;
a photosensitive resist coating step of coating photosensitive resist on the molding plane surface surrounding by the outer circumferential packing member to form a photosensitive resist layer;
a cutting step of irradiating light beams onto the photosensitive resist layer in correspondence with uneven pattern, formed at a disc-shaped recording medium to allow a portion of the photosensitive resist layer to be exposed to light to form latent image pattern;
a development step of developing the photosensitive resist layer to form uneven pattern in which the latent image pattern is actualized on the molding plane surface;
an etching step of implementing etching processing to the first metal mold to thereby form, on the molding plane surface, very small recessed portions in correspondence with uneven patterns, etc. formed at the disc-shaped recording medium;
a cleaning step of removing the photosensitive resist layer from the molding plane surface;
a packing member detachment step of detaching the packing shaft and the outer circumferential packing member from the first metal mold; and
a step of connecting a temperature control mechanism to at least one of the first and second metal molds for maintaining a temperature of the first and second molds to a level not lower than $(Tg-24)°$ C. when the synthetic resin is cooled and solidified and wherein Tg is the glass transition temperature of the synthetic resin material.

22. A method of manufacturing a disc substrate molding metal mold apparatus as set forth in claim 21,
wherein the fitting step of the packing shaft is carried out by fitting the packing shaft into a center hole thereof in the state where at least one metal mode where the pattern area is formed is heated, and clearance is set to 2 $\mu$m or less.

23. A method of manufacturing a disc substrate molding metal mold apparatus as set forth in claim 21,
wherein the fitting step of the outer circumferential packing member is carried out by fitting the outer circumferential packing member with respect to the outer circumferential portion of the first metal mold in the heated, and clearance is set to 2 $\mu$m or less.

24. A method of manufacturing a disc substrate molding metal mold apparatus as set forth in claim 21,
which further comprises, between the packing member fitting step and the photosensitive resist coating step,
a metallic film formation step of forming a metallic film layer on the molding plane surface with respect to the first metal mold in which the packing shaft is fitted into the center hole and the outer circumferential packing member is fitted with respect to the outer circumferential portion by the packing member fitting step, and
a metallic film polishing step of implementing polishing or abrasion processing to the metallic film layer to form smooth photosensitive resist coating surface.

25. A method of manufacturing a disc substrate molding metal mold apparatus as set forth in claim 24,
wherein the metallic film layer formed on the molding plane surface by the metallic film formation step is such that its film thickness is set to 5 $\mu$m or more, and is subjected to polishing or abrasion processing by the metallic film polishing step so that its film thickness becomes equal to 1 $\mu$m or more.

26. A disc substrate molded or formed by injecting synthetic resin material with respect to a molding portion of a metal mold apparatus comprising a first metal mold serving as the fixed side and a second metal mold serving as the movable side which are adapted so that they are butted to each other to constitute the molding portion for carrying out molding of the disc substrate, and such that a smoothing layer of metal is integrally formed on the molding plane surface side of at least one of the first and second metal molds, the metal mold apparatus further comprising temperature controlling means for controlling the temperature of the first metal mold and the second metal mold, said temperature controlling means controlling a temperature of the metal molds to a level not lower than $(Tg-24)°$ C. when the synthetic resin material is cooled and solidified, wherein Tg is the glass transition temperature of the synthetic resin material.

27. A disc substrate as set forth in claim 26,
wherein height from disc substrate average plane of waviness in projection form within projected area where a floating magnetic head is projected onto the disc substrate surface is lower than floating height of the floating magnetic head with respect to the disc substrate average plane surface.

28. A disc substrate as set forth in claim 27,
wherein height of the waviness in the projection form is 80% or less of floating height of the floating magnetic head.

29. A disc substrate for disc-shaped recording medium, the disc substrate being formed by a metal mold apparatus comprising a first metal mold serving as the fixed side and a second metal mold serving as the movable side which are adapted so that they are butted to each other to constitute a molding portion for carrying out molding of the disc substrate, and such that a pattern area for forming uneven pattern formed at the disc substrate to be molded or formed is formed, and recording and/or reproduction of information signals are carried out by a floating magnetic head floating with respect to disc average plane surface, the metal mold apparatus further comprising temperature controlling means for controlling the temperature of the first metal mold and the second metal mold, said temperature controlling means controlling a temperature of the metal molds to a level not lower than (Tg−24)° C. when the synthetic resin material is cooled and solidified,
wherein height from the disc substrate average plane surface of waviness in projection form within a projected area where the floating magnetic head is projected onto the disc substrate surface is lower than floating height of the floating magnetic head with respect to the disc substrate average plane surface and wherein Tg is the glass transition temperature of the synthetic resin material.

30. A disc substrate as set forth in claim 29,
wherein height of the waviness in the projection form is 80% or less of floating height of the floating magnetic head.

* * * * *